United States Patent
Zhang et al.

(10) Patent No.: US 10,205,395 B2
(45) Date of Patent: Feb. 12, 2019

(54) SYSTEMS AND METHODS FOR CURRENT CONTROL OF POWER CONVERSION SYSTEMS

(71) Applicant: ON-BRIGHT ELECTRONICS (SHANGHAI) CO., LTD., Shanghai (CN)

(72) Inventors: Yunchao Zhang, Shanghai (CN); Lieyi Fang, Shanghai (CN)

(73) Assignee: On-Bright Electronics (Shanghai) Co., Ltd., Shanghai (CN)

(*) Notice: Subject to any disclaimer, the term of this patent is extended or adjusted under 35 U.S.C. 154(b) by 0 days.

(21) Appl. No.: 15/352,133

(22) Filed: Nov. 15, 2016

(65) Prior Publication Data

US 2017/0126137 A1    May 4, 2017

Related U.S. Application Data

(63) Continuation of application No. 14/726,295, filed on May 29, 2015, now Pat. No. 9,531,278, which is a (Continued)

(30) Foreign Application Priority Data

Jul. 24, 2012  (CN) .......................... 2012 1 0258359

(51) Int. Cl.
*H02M 3/155* (2006.01)
*H02M 3/335* (2006.01)
(Continued)

(52) U.S. Cl.
CPC ......... *H02M 3/33515* (2013.01); *H02M 1/08* (2013.01); *H02M 3/33507* (2013.01); *H05B 33/0815* (2013.01); *H02M 2001/0009* (2013.01)

(58) Field of Classification Search
CPC .......................... H02M 3/155; H02M 3/33515
(Continued)

(56) References Cited

U.S. PATENT DOCUMENTS 5,497,119 A * 3/1996 Tedrow ................... G05F 1/465
  323/265
6,069,458 A   5/2000 Takehara et al.
(Continued)

FOREIGN PATENT DOCUMENTS

CN       1806381 A    7/2006
CN     101039075 A    9/2007
(Continued)

OTHER PUBLICATIONS

United States Patent and Trademark Office, Office Action dated Jun. 30, 2017, in U.S. Appl. No. 14/824,018.
(Continued)

*Primary Examiner* — Adolf D Berhane
*Assistant Examiner* — Nusrat Quddus
(74) *Attorney, Agent, or Firm* — Faegre Baker Daniels LLP

(57) ABSTRACT

System and method for regulating an output current of a power conversion system. An example system controller for regulating an output current of a power conversion system includes a driving component, a demagnetization detector, a current-regulation component, and a signal processing component. The driving component is configured to output a drive signal to a switch in order to affect a primary current flowing through a primary winding of the power conversion system. The demagnetization detector is configured to receive a feedback signal associated with an output voltage of the power conversion system and generate a detection signal based on at least information associated with the feedback signal. The current-regulation component is con-
(Continued)

figured to receive the drive signal, the detection signal and a current-sensing signal and output a current-regulation signal based on at least information associated with the drive signal, the detection signal, and the current sensing signal.

53 Claims, 14 Drawing Sheets

Related U.S. Application Data continuation of application No. 13/572,480, filed on Aug. 10, 2012, now Pat. No. 9,088,218.

(51) Int. Cl.
*H02M 1/08* (2006.01)
*H05B 33/08* (2006.01)
*H02M 1/00* (2006.01)

(58) Field of Classification Search
USPC .......................................... 363/21.12–21.18
See application file for complete search history.

(56) References Cited

U.S. PATENT DOCUMENTS

| | | | |
|---|---|---|---|
| 6,977,824 B1 | 12/2005 | Yang et al. |
| 7,061,780 B2 | 6/2006 | Yang et al. |
| 7,394,634 B2 | 7/2008 | Fang et al. |
| 7,535,736 B2 | 5/2009 | Nakamura et al. |
| 7,869,229 B2 | 1/2011 | Huynh et al. |
| 7,898,187 B1* | 3/2011 | Mei .................... H05B 33/0815 |
| | | | 315/185 S |
| 7,990,202 B2 | 8/2011 | Fang et al. |
| 8,013,544 B2 | 9/2011 | Negrete et al. |
| 8,093,826 B1 | 1/2012 | Eagar et al. |
| 8,144,487 B2 | 3/2012 | Djenguerian et al. |
| 8,391,028 B2 | 3/2013 | Yeh |
| 8,416,596 B2 | 4/2013 | Huang |
| 8,525,442 B2 | 9/2013 | Zimmermann et al. |
| 8,593,075 B1 | 11/2013 | Melanson et al. |
| 8,630,103 B2 | 1/2014 | Bäurle et al. |
| 8,664,883 B2 | 3/2014 | Hiramatu et al. |
| 8,824,173 B2 | 9/2014 | Fang et al. |
| 8,917,527 B2 | 12/2014 | Fang et al. |
| 9,084,317 B2 | 7/2015 | Fang et al. |
| 9,088,218 B2 | 7/2015 | Zhang et al. |
| 9,124,188 B2 | 9/2015 | Fang et al. |
| 9,148,061 B2 | 9/2015 | Fang et al. |
| 9,343,979 B2 | 5/2016 | Fang et al. |
| 9,531,278 B2 | 12/2016 | Zhang et al. |
| 9,794,997 B2 | 10/2017 | Fang et al. |
| 9,807,840 B2 | 10/2017 | Fang et al. |
| 9,812,970 B2 | 11/2017 | Fang et al. |
| 9,954,446 B2 | 4/2018 | Fang et al. |
| 9,986,605 B2 | 5/2018 | Fang |
| 10,003,271 B2 | 6/2018 | Fang et al. |
| 2002/0080625 A1* | 6/2002 | Goyhenetche ........ H02M 3/156 |
| | | | 363/21.01 |
| 2003/0174520 A1* | 9/2003 | Bimbaud ............ H02M 3/3385 |
| | | | 363/19 |
| 2006/0113975 A1 | 6/2006 | Mednik et al. |
| 2006/0244429 A1 | 11/2006 | Quitayen |
| 2007/0120506 A1 | 5/2007 | Grant |
| 2008/0067993 A1 | 3/2008 | Coleman |
| 2008/0191679 A1 | 8/2008 | Williams |
| 2009/0051336 A1 | 2/2009 | Hartlieb et al. |
| 2009/0051340 A1 | 2/2009 | Wang |
| 2009/0091953 A1 | 4/2009 | Huynh et al. |
| 2009/0261758 A1 | 10/2009 | Ger |
| 2009/0273292 A1 | 11/2009 | Zimmermann |
| 2009/0289618 A1 | 11/2009 | Tajima et al. |
| 2010/0019682 A1 | 1/2010 | Lu et al. |
| 2010/0020573 A1 | 1/2010 | Melanson |
| 2010/0128501 A1 | 5/2010 | Huang et al. |
| 2010/0141178 A1 | 6/2010 | Negrete et al. |
| 2010/0238689 A1* | 9/2010 | Fei .................... H02M 3/33523 |
| | | | 363/21.16 |
| 2010/0308733 A1 | 12/2010 | Shao |
| 2010/0321956 A1 | 12/2010 | Yeh |
| 2011/0044076 A1 | 2/2011 | Zhang et al. |
| 2011/0096574 A1* | 4/2011 | Huang .............. H02M 3/33507 |
| | | | 363/21.18 |
| 2011/0148376 A1 | 6/2011 | Xu et al. |
| 2011/0254457 A1 | 10/2011 | Marent et al. |
| 2011/0267846 A1 | 11/2011 | Djenguerian et al. |
| 2011/0292704 A1 | 12/2011 | Makino et al. |
| 2012/0008344 A1 | 1/2012 | Zeng et al. |
| 2012/0049758 A1 | 3/2012 | Hwang et al. |
| 2012/0049825 A1 | 3/2012 | Chen et al. |
| 2012/0075891 A1 | 3/2012 | Zhang et al. |
| 2012/0105030 A1 | 5/2012 | Chen et al. |
| 2012/0120342 A1 | 5/2012 | Uchimoto et al. |
| 2012/0146532 A1 | 6/2012 | Ivey et al. |
| 2012/0147630 A1 | 6/2012 | Cao et al. |
| 2012/0155122 A1 | 6/2012 | Tang et al. |
| 2012/0195076 A1 | 8/2012 | Zhang et al. |
| 2012/0217890 A1 | 8/2012 | Chang et al. |
| 2012/0281438 A1 | 11/2012 | Fang et al. |
| 2012/0320640 A1 | 12/2012 | Baurle et al. |
| 2013/0033905 A1 | 2/2013 | Lin et al. |
| 2013/0038227 A1 | 2/2013 | Yan et al. |
| 2013/0093356 A1 | 4/2013 | Green et al. |
| 2013/0114307 A1 | 5/2013 | Fang et al. |
| 2013/0119881 A1 | 5/2013 | Fang et al. |
| 2013/0147379 A1 | 6/2013 | Zhou et al. |
| 2013/0148387 A1* | 6/2013 | Ren .......................... H02M 1/36 |
| | | | 363/21.16 |
| 2013/0258723 A1 | 10/2013 | Fang et al. |
| 2013/0307431 A1 | 11/2013 | Zhu et al. |
| 2014/0029315 A1 | 1/2014 | Zhang et al. |
| 2014/0043879 A1 | 2/2014 | Eum et al. |
| 2014/0104895 A1* | 4/2014 | Baurle ............. H02M 3/33507 |
| | | | 363/21.13 |
| 2014/0140109 A1* | 5/2014 | Valley ................. H02M 1/4258 |
| | | | 363/21.17 |
| 2014/0146578 A1 | 5/2014 | Fang et al. |
| 2014/0177280 A1 | 6/2014 | Yang et al. |
| 2015/0084530 A1 | 3/2015 | Kitamura et al. |
| 2015/0180347 A1 | 6/2015 | Fang et al. |
| 2015/0188441 A1 | 7/2015 | Fang et al. |
| 2015/0295494 A1 | 10/2015 | Gong |
| 2015/0311804 A1 | 10/2015 | Fang |
| 2015/0326130 A1 | 11/2015 | Zhang et al. |
| 2015/0334803 A1 | 11/2015 | Fang et al. |
| 2016/0028318 A1 | 1/2016 | Fang et al. |
| 2016/0276939 A1 | 9/2016 | Fang et al. |
| 2016/0278178 A1 | 9/2016 | Fang et al. |
| 2016/0285375 A1 | 9/2016 | Fang et al. |
| 2016/0329821 A1 | 11/2016 | Zhang et al. |
| 2018/0042078 A1 | 2/2018 | Fang et al. |
| 2018/0042079 A1 | 2/2018 | Fang et al. |
| 2018/0076717 A1 | 3/2018 | Fang et al. |
| 2018/0124891 A1 | 5/2018 | Fang et al. |

FOREIGN PATENT DOCUMENTS

| | | |
|---|---|---|
| CN | 101056063 A | 10/2007 |
| CN | 101164384 A | 4/2008 |
| CN | 201087939 Y | 7/2008 |
| CN | 101248574 A | 8/2008 |
| CN | 101777848 A | 7/2010 |
| CN | 101835311 A | 9/2010 |
| CN | 1882214 B | 5/2011 |
| CN | 102055344 A | 5/2011 |
| CN | 102065602 A | 5/2011 |
| CN | 102076138 A | 5/2011 |
| CN | 102076149 A | 5/2011 |
| CN | 102083257 A | 6/2011 |
| CN | 102105010 A | 6/2011 |
| CN | 102158091 A | 8/2011 |
| CN | 102164439 A | 8/2011 |
| CN | 102185466 A | 9/2011 |

(56) References Cited

FOREIGN PATENT DOCUMENTS

| | | |
|---|---|---|
| CN | 102187736 A | 9/2011 |
| CN | 102202449 A | 9/2011 |
| CN | 102361402 A | 2/2012 |
| CN | 102437842 A | 5/2012 |
| CN | 102638165 A | 8/2012 |
| CN | 102651613 A | 8/2012 |
| CN | 102651935 A | 8/2012 |
| CN | 202435294 U | 9/2012 |
| CN | 103108437 | 5/2013 |
| CN | 103441660 A | 12/2013 |
| JP | 2011171231 | 9/2011 |
| TW | 185041 | 6/1992 |
| TW | 583817 | 4/2004 |
| TW | I 312914 | 8/2009 |
| TW | I 338994 | 3/2011 |
| TW | M412573 | 9/2011 |
| TW | 201134078 | 10/2011 |
| TW | I 357708 | 2/2012 |
| TW | 201218594 | 5/2012 |
| TW | 201249079 A | 12/2012 |
| TW | I 362170 | 12/2012 |
| TW | 201308842 A | 2/2013 |
| WO | WO 2007/041897 A1 | 4/2007 |

OTHER PUBLICATIONS

United States Patent and Trademark Office, Office Action dated Jun. 2, 2017, in U.S. Appl. No. 15/054,026.
United States Patent and Trademark Office, Notice of Allowance dated Jun. 29, 2017, in U.S. Appl. No. 15/054,032.
United States Patent and Trademark Office, Notice of Allowance dated Jun. 5, 2017, in U.S. Appl. No. 15/055,366.
United States Patent and Trademark Office, Notice of Allowance dated Jul. 12, 2017, in U.S. Appl. No. 14/728,815.
Chinese Patent Office, Office Action dated Apr. 14, 2017, in Application No. 201510622975.2.
United States Patent and Trademark Office, Notice of Allowance dated Feb. 14, 2017, in U.S. Appl. No. 15/055,366.
United States Patent and Trademark Office, Office Action dated Mar. 22, 2017, in U.S. Appl. No. 15/152,362.
United States Patent and Trademark Office, Notice of Allowance dated Apr. 14, 2017, in U.S. Appl. No. 14/273,339.
United States Patent and Trademark Office, Notice of Allowance dated Apr. 14, 2017, in U.S. Appl. No. 15/054,032.
United States Patent and Trademark Office, Notice of Allowance dated Apr. 19, 2017, in U.S. Appl. No. 14/728,815.
Chinese Patent Office, Office Action dated Apr. 24, 2014, in Application No. 201210099930.8.
Chinese Patent Office, Office Action dated Apr. 3, 2014, in Application No. 201210258359.X.
Chinese Patent Office, Office Action dated May 14, 2014, in Application No. 201110123187.0.
Chinese Patent Office, Office Action dated Nov. 22, 2013, in Application No. 201110376439.0.
Chinese Patent Office, Office Action dated Apr. 15, 2015, in Application No. 201410053176.3.
Liang et al., "Differential Detection Method of MOSFET Drain-source Voltage Valley Time," (Mar. 31, 2010).

Taiwanese Patent Office, Office Action dated Mar. 6, 2014, in Application No. 101102919.
Taiwanese Patent Office, Office Action dated Nov. 10, 2014, in Application No. 101118856.
Taiwanese Patent Office, Office Action dated Oct. 22, 2013, in Application No. 100120903.
Taiwanese Patent Office, Office Action dated Sep. 2, 2014, in Application No. 101144020.
Taiwanese Patent Office, Office Action dated Dec. 15, 2015, in Application No. 103140986.
United States Patent and Trademark Office, Office Action dated Nov. 18, 2015, in U.S. Appl. No. 14/273,339.
United States Patent and Trademark Office, Office Action dated Jul. 27, 2016, in U.S. Appl. No. 14/273,339.
United States Patent and Trademark Office, Office Action dated Aug. 10, 2016, in U.S. Appl. No. 14/728,815.
United States Patent and Trademark Office, Office Action dated Nov. 2, 2016, in U.S. Appl. No. 14/824,018.
United States Patent and Trademark Office, Office Action dated Dec. 27, 2016, in U.S. Appl. No. 15/054,026.
United States Patent and Trademark Office, Notice of Allowance dated Jan. 13, 2017, in U.S. Appl. No. 15/054,032.
United States Patent and Trademark Office, Notice of Allowance dated Jan. 24, 2018, in U.S. Appl. No. 14/273,339.
United States Patent and Trademark Office, Notice of Allowance dated Jan. 18, 2018, in U.S. Appl. No. 14/824,018.
Chinese Patent Office, Office Action dated Oct. 10, 2017, in Application No. 201610177113.8.
Chinese Patent Office, Office Action dated Oct. 23, 2017, in Application No. 201610177276.6.
Chinese Patent Office, Office Action dated Dec. 25, 2017, in Application No. 201610177097.2.
United States Patent and Trademark Office, Notice of Allowance dated Sep. 21, 2017, in U.S. Appl. No. 14/273,339.
United States Patent and Trademark Office, Notice of Allowance dated Oct. 17, 2017, in U.S. Appl. No. 15/054,026.
United States Patent and Trademark Office, Notice of Allowance dated Dec. 18, 2017, in U.S. Appl. No. 15/054,026.
United States Patent and Trademark Office, Notice of Allowance dated Nov. 14, 2017, in U.S. Appl. No. 14/824,018.
United States Patent and Trademark Office, Office Action dated Dec. 18, 2017, in U.S. Appl. No. 15/152,362.
Chinese Patent Office, Office Action dated Jul. 2, 2018, in Application No. 201610177276.6.
United States Patent and Trademark Office, Notice of Allowance dated Jul. 6, 2018, in U.S. Appl. No. 15/152,362.
United States Patent and Trademark Office, Office Action dated Mar. 1, 2018, in U.S. Appl. No. 15/683,489.
United States Patent and Trademark Office, Notice of Allowance dated Feb. 12, 2018, in U.S. Appl. No. 15/707,184.
United States Patent and Trademark Office, Notice of Allowance dated Jun. 15, 2018, in U.S. Appl. No. 15/707,184.
United States Patent and Trademark Office, Notice of Allowance dated Aug. 9, 2018, in U.S. Appl. No. 15/683,402.
United States Patent and Trademark Office, Office Action dated Oct. 4, 2018, in U.S. Appl. No. 15/683,489.
United States Patent and Trademark Office, Notice of Allowance dated Sep. 28, 2018, in U.S. Appl. No. 15/812,933.
United States Patent and Trademark Office, Notice of Allowance dated Dec. 5, 2018, in U.S. Appl. No. 15/152,362.

\* cited by examiner

SYSTEMS AND METHODS FOR CURRENT CONTROL OF POWER CONVERSION SYSTEMS

1. CROSS-REFERENCES TO RELATED APPLICATIONS

This application is a continuation of U.S. patent application Ser. No. 14/726,295, filed May 29, 2015, which is a continuation of U.S. patent application Ser. No. 13/572,480, filed Aug. 10, 2012, which claims priority to Chinese Patent Application No. 201210258359.X, filed Jul. 24, 2012, all of the above-referenced applications being commonly assigned and incorporated by reference herein for all purposes.

2. BACKGROUND OF THE INVENTION

The present invention is directed to integrated circuits. More particularly, the invention provides systems and methods for current control. Merely by way of example, the invention has been applied to constant current control of power conversion systems. But it would be recognized that the invention has a much broader range of applicability.

FIG. 1 is a simplified diagram showing a conventional flyback power conversion system. The power conversion system 100 includes a primary winding 110, a secondary winding 112, an auxiliary winding 114, a power switch 120, a current sensing resistor 130, two rectifying diodes 160 and 168, two capacitors 162 and 170, and two resistors 164 and 166. For example, the power switch 120 is a bipolar transistor. In another example, the power switch 120 is a metal-oxide-semiconductor (MOS) transistor. In yet another example, the power conversion system 100 provides power to one or more light-emitting-diodes (LED) 199.

The auxiliary winding 114 can be used to extract information associated with an output voltage 150 on the secondary side so that the output voltage 150 can be regulated. When the power switch 120 is closed (e.g., on), the energy is stored in the transformer including the primary winding 110 and the secondary winding 112. When the power switch 120 is open (e.g., off), the stored energy is released to the output terminal. The voltage of the auxiliary winding 114 maps the output voltage 150. The auxiliary winding 114 and associated components (e.g., the resistors 164 and 166) generates a feedback signal 174 which can be determined based on the following equation:

$$V_{FB} = \frac{R_2}{R_1 + R_2} \times V_{aux} \qquad \text{(Equation 1)}$$

where $V_{FB}$ represents the feedback signal 174, and $V_{aux}$ represents a voltage 154 of the auxiliary winding 114. $R_1$ and $R_2$ represent the resistance values of the resistors 164 and 166 respectively.

For example, the switch 120 is associated with a switching period including an on-time period during which the switch 120 is closed (e.g., on) and an off-time period during which the switch 120 is open (e.g., off). As an example, in a continuous conduction mode (CCM), a next switching cycle starts prior to the completion of a demagnetization process associated with the transformer including the primary winding 110 and the secondary winding 112. Therefore, the duration of the demagnetization process (e.g., a demagnetization period) before the next switching cycle starts is approximately equal to the off-time period of the switch. For example, in a discontinuous conduction mode (DCM), a next switching cycle does not start until a time period after the demagnetization process has completed. In another example, in a critical conduction mode (CRM) (e.g., a quasi-resonant (QR) mode), a next switching cycle starts shortly after the completion of the demagnetization process.

FIG. 2 is a simplified conventional timing diagram for the flyback power conversion system 100 that operates in the continuous conduction mode (CCM). The waveform 202 represents the feedback signal 174 of the auxiliary winding 114 as a function of time, the waveform 204 represents a primary current 176 that flows through the primary winding 110 as a function of time, and the waveform 206 represents a secondary current 178 that flows through the secondary winding 112 as a function of time.

For example, a switching period, $T_s$, starts at time $t_0$ and ends at time $t_2$, an on-time period, $T_{on}$, starts at the time $t_0$ and ends at time $t_1$, and a demagnetization period, $T_{dem}$, starts at the time $t_1$ and ends at the time $t_2$. In another example, an off-time period is approximately equal in duration to the demagnetization period. In yet another example, $t_0 \leq t_1 \leq t_2$.

During the on-time period $T_{on}$, the power switch 120 is closed (e.g., on), and the primary current 176 flows through the primary winding 110 and increases from a magnitude 208 (e.g., at $t_0$) to a magnitude 210 (e.g., at $t_1$) as shown by the waveform 204. The secondary current 178 is at a low magnitude 212 (e.g., approximately zero) as shown by the waveform 206. The feedback signal 174 keeps at a magnitude 214 (e.g., as shown by the waveform 202).

At the beginning of the demagnetization period $T_{off}$ (e.g., at $t_1$), the switch 120 is open (e.g., off), the primary current 176 is reduced from the magnitude 210 to a magnitude 216 (e.g., approximately zero) as shown by the waveform 204. The secondary current 178 increases from the magnitude 212 (e.g., approximately zero) to a magnitude 218 as shown by the waveform 206. The feedback signal 174 increases from the magnitude 214 to a magnitude 220 (e.g., as shown by the waveform 202).

During the demagnetization period $T_{dem}$, the switch 120 remains open, the primary current 176 keeps at the magnitude 216 (e.g., approximately zero) as shown by the waveform 204. The secondary current 178 decreases from the magnitude 218 (e.g., at $t_1$) to a magnitude 222 (e.g., at $t_2$) as shown by the waveform 206. The feedback signal 174 decreases from the magnitude 220 to a magnitude 222 (e.g., as shown by the waveform 202).

At the end of the demagnetization period $T_{dem}$ (e.g., at $t_2$), a next switching cycle starts before the demagnetization process is completed. The residual energy reflects back to the primary winding 110 and appears as an initial primary current 224 at the beginning of the next switching cycle.

As an example, the primary current 176 and the secondary current 178 satisfy the following equations:

$$I_{sec\_1} = N \times I_{pri\_1} \qquad \text{(Equation 2)}$$

$$I_{sec\_0} = N \times I_{pri\_0} \qquad \text{(Equation 3)}$$

where $I_{sec\_1}$ represents the secondary current 178 when the demagnetization period $T_{dem}$ starts, and $I_{sec\_0}$ represents the secondary current 178 when the demagnetization period $T_{dem}$ ends. Additionally, $I_{pri\_1}$ represents the primary current 176 when the on-time period $T_{on}$ ends, $I_{pri\_0}$ represents the primary current 176 when the on-time period $T_{on}$ starts, and N represents a turns ratio between the primary winding 110 and the secondary winding 112.

For example, the output current 152 is equal to an average of the secondary current 178 as shown by the following equation.

$$I_{out} = \frac{1}{2} \times \frac{1}{T} \times \int_0^T (I_{sec\_1} + I_{sec\_0}) \times \frac{T_{dem}}{T_s} dt \quad \text{(Equation 4)}$$

where $I_{out}$ represents an output current 152 on the secondary side, T represents an integration period, $T_s$ represents a switching period, and $T_{dem}$ represents the duration of the demagnetization process within the switching period.

Therefore, the output current 152 satisfies the following equation:

$$I_{out} = \frac{N}{2} \times \frac{1}{T} \times \int_0^T (I_{pri\_1} + I_{pri\_0}) \times \frac{T_{dem}}{T_s} dt \quad \text{(Equation 5)}$$

As shown in FIG. 1, the resistor 130, in combination with other components, generates a current-sensing voltage signal 172 which is related to the primary current 176. For example, the output current 152 can be determined according to the following equations:

$$I_{out} = \frac{N}{2} \times \frac{1}{R_s} \times \frac{1}{T} \times \int_0^T (V_{cs1} + V_{cs0}) \times \frac{T_{dem}}{T_s} dt \quad \text{(Equation 6)}$$

or $$I_{out} = \frac{N}{2} \times \frac{1}{R_s} \times \frac{1}{K} \times \sum_1^K (V_{cs1}(n) + V_{cs0}(n)) \times \frac{T_{dem}(n)}{T_s(n)} \quad \text{(Equation 7)}$$

where $V_{cs0}$ represents the current-sensing voltage signal 172 when an on-time period starts during a switching cycle, $V_{cs1}$ represents the current-sensing voltage signal 172 when the on-time period ends during the switching cycle, and $R_s$ represents the resistance of the resistor 130. In addition, n corresponds to the $n^{th}$ switching cycle, $V_{cs0}(n)$ represents a magnitude of the current-sensing voltage signal 172 when an on-time period $T_{on}$ starts in the $n^{th}$ switching cycle, $V_{cs1}(n)$ represents a magnitude of the current-sensing voltage signal 172 when the on-time period ends in the $n^{th}$ switching cycle, and K represents the number of switching cycles that are included in the calculation. For example, K can be infinite; that is, the calculation of Equation 7 can include as many switching cycles as needed.

The output current 152 may thus be regulated based on information associated with the current-sensing voltage signal 172, the demagnetization process, and/or the switching period. However, the conventional current control schemes often suffer from low measurement accuracy.

Hence it is highly desirable to improve the techniques for current control of power conversion systems.

3. BRIEF SUMMARY OF THE INVENTION

The present invention is directed to integrated circuits. More particularly, the invention provides systems and methods for current control. Merely by way of example, the invention has been applied to constant current control of power conversion systems. But it would be recognized that the invention has a much broader range of applicability.

According to one embodiment, a system controller for regulating an output current of a power conversion system includes a driving component, a demagnetization detector, a current-regulation component and a signal processing component. The driving component is configured to output a drive signal to a switch in order to affect a primary current flowing through a primary winding of the power conversion system, the drive signal being associated with at least a switching period, the switching period including an on-time period and a demagnetization period. The demagnetization detector is configured to receive a feedback signal associated with an output voltage of the power conversion system and generate a detection signal based on at least information associated with the feedback signal, the detection signal indicating the demagnetization period. The current-regulation component is configured to receive the drive signal, the detection signal and a current-sensing signal and output a current-regulation signal based on at least information associated with the drive signal, the detection signal, and the current sensing signal, the current-sensing signal representing the primary current in magnitude. In addition, the signal processing component is configured to receive the current-regulation signal and output a processed signal to the driving component in order to generate the drive signal.

According to another embodiment, a system controller for regulating an output current of a power conversion system includes a driving component, a current-regulation component, an amplifier and a comparator. The driving component is configured to output a drive signal to a switch in order to affect a primary current flowing through a primary winding of the power conversion system, the drive signal being associated with at least a switching period, the switching period including an on-time period and a demagnetization period. The current-regulation controller is configured to receive the drive signal, a detection signal and a current-sensing signal and output a first signal based on at least information associated with the drive signal, the detection signal, and the current sensing signal, the detection signal indicating the demagnetization period, the current-sensing signal representing the primary current in magnitude. The amplifier is configured to receive the first signal and a reference signal and generate, with at least a capacitor, an amplified signal based on at least information associated with the first signal and the reference signal. The comparator configured to receive the amplified signal and a ramp signal and generate a comparison signal based on at least information associated with the amplified signal and the ramp signal, the ramp signal being associated with at least a ramping period. The driving component is further configured to receive the comparison signal and a second signal associated with at least a signal period, process information associated with the comparison signal and the second signal, and generate the drive signal based on at least information associated with the comparison signal and the second signal.

According to yet another embodiment, a system controller for detecting a demagnetization period associated with a power conversion system includes a differentiation component, a comparator, and a detection component. The differentiation component is configured to receive a feedback signal associated with an output signal of the power conversion system and output a processed signal based on at least information associated with the feedback signal. The comparator is configured to receive at least the processed signal and generate a comparison signal based on at least information associated with the processed signal. The detection component is configured to receive at least the comparison signal and output a detection signal based on at least information associated with the comparison signal. The differentiation component includes a capacitor, a resistor and a current source. The capacitor includes a first capacitor terminal and a second capacitor terminal, the first capacitor terminal being configured to receive the feedback signal. The resistor includes a first resistor terminal and a second resistor terminal, the first resistor terminal being configured to output the processed signal, the second resistor terminal being biased to a predetermined voltage. The current source includes a first component terminal and a second component terminal, the first component terminal being coupled to the second capacitor terminal and the first resistor terminal.

In one embodiment, a method for regulating an output current of a power conversion system includes outputting a drive signal to a switch in order to affect a primary current flowing through a primary winding of the power conversion system, the drive signal being associated with at least a switching period, the switching period including an on-time period and a demagnetization period, receiving a feedback signal associated with an output voltage of the power conversion system, and processing information associated with the feedback signal. The method further includes generating a detection signal based on at least information associated with the feedback signal, the detection signal indicating the demagnetization period, receiving the drive signal, the detection signal and a current-sensing signal, the current-sensing signal representing the primary current in magnitude, and processing information associated with the drive signal, the detection signal and the current-sensing signal. In addition, the method includes outputting a current-regulation signal based on at least information associated with the drive signal, the detection signal, and the current sensing signal, receiving the current-regulation signal, processing information associated with the current-regulation signal, and outputting a processed signal to the driving component in order to generate the drive signal.

In another embodiment, a method for regulating an output current of a power conversion system includes outputting a drive signal to a switch in order to affect a primary current flowing through a primary winding of the power conversion system, the drive signal being associated with at least a switching period, the switching period including an on-time period and a demagnetization period, receiving the drive signal, a detection signal and a current-sensing signal, the detection signal indicating the demagnetization period, the current-sensing signal representing the primary current in magnitude, and processing information associated with the drive signal, the detection signal and the current-sensing signal. The method further includes outputting a first signal based on at least information associated with the drive signal, the detection signal, and the current sensing signal, receiving the first signal and a reference signal, and processing information associated with the first signal and the reference signal. In addition, the method includes generating, with at least a capacitor, an amplified signal based on at least information associated with the first signal and the reference signal, receiving the amplified signal and a ramp signal, the ramp signal being associated with at least a ramping period, and processing information associated with the amplified signal and the ramp signal. Furthermore, the method includes generating a comparison signal based on at least information associated with the amplified signal and the ramp signal, receiving the comparison signal and a second signal associated with at least a signal period, processing information associated with the comparison signal and the second signal, and generating the drive signal based on at least information associated with the comparison signal and the second signal.

In yet another embodiment, a method for detecting a demagnetization period associated with a power conversion system includes receiving, by at least a capacitor, a feedback signal associated with an output signal of the power conversion system, the capacitor including a first capacitor terminal and a second capacitor terminal, the first capacitor terminal receiving the feedback signal, the second capacitor terminal being coupled to a first component terminal of a current source, the current source further including a second component terminal, providing a current, by the current source, to at least a resistor including a first resistor terminal and a second resistor terminal, the first resistor terminal being coupled to the first component terminal, the second resistor terminal being biased to a predetermined voltage, and processing information associated with the feedback signal and the current. The method further includes outputting, by at least the first resistor terminal, a processed signal based on at least information associated with the feedback signal and the current, receiving at least the processed signal and a reference signal, and processing information associated with the processed signal and the reference signal. In addition, the method includes generating a comparison signal based on at least information associated with the processed signal and the reference signal, receiving at least the comparison signal, and generating a detection signal based on at least information associated with the comparison signal.

Many benefits are achieved by way of the present invention over conventional techniques. For example, some embodiments of the present invention sample a current sensing signal at a middle point of an on-time period to reduce the sampling errors associated with sampling twice the current sensing signal during the on-time period. In another example, certain embodiments of the present invention sample the current sensing signal at the middle point of an on-time period to reduce the sampling errors associated with sampling the current sensing signal shortly after the beginning of the on-time period. In yet another example, some embodiments of the present invention accurately detect the end of a demagnetization process without including a time period related to resonance into the demagnetization period to reduce measurement errors thereof.

Depending upon embodiment, one or more benefits may be achieved. These benefits and various additional objects, features and advantages of the present invention can be fully appreciated with reference to the detailed description and accompanying drawings that follow.

4. BRIEF DESCRIPTION OF THE DRAWINGS

5. DETAILED DESCRIPTION OF THE INVENTION

The present invention is directed to integrated circuits. More particularly, the invention provides systems and methods for current control. Merely by way of example, the invention has been applied to constant current control of power conversion systems. But it would be recognized that the invention has a much broader range of applicability.

Figure 1:
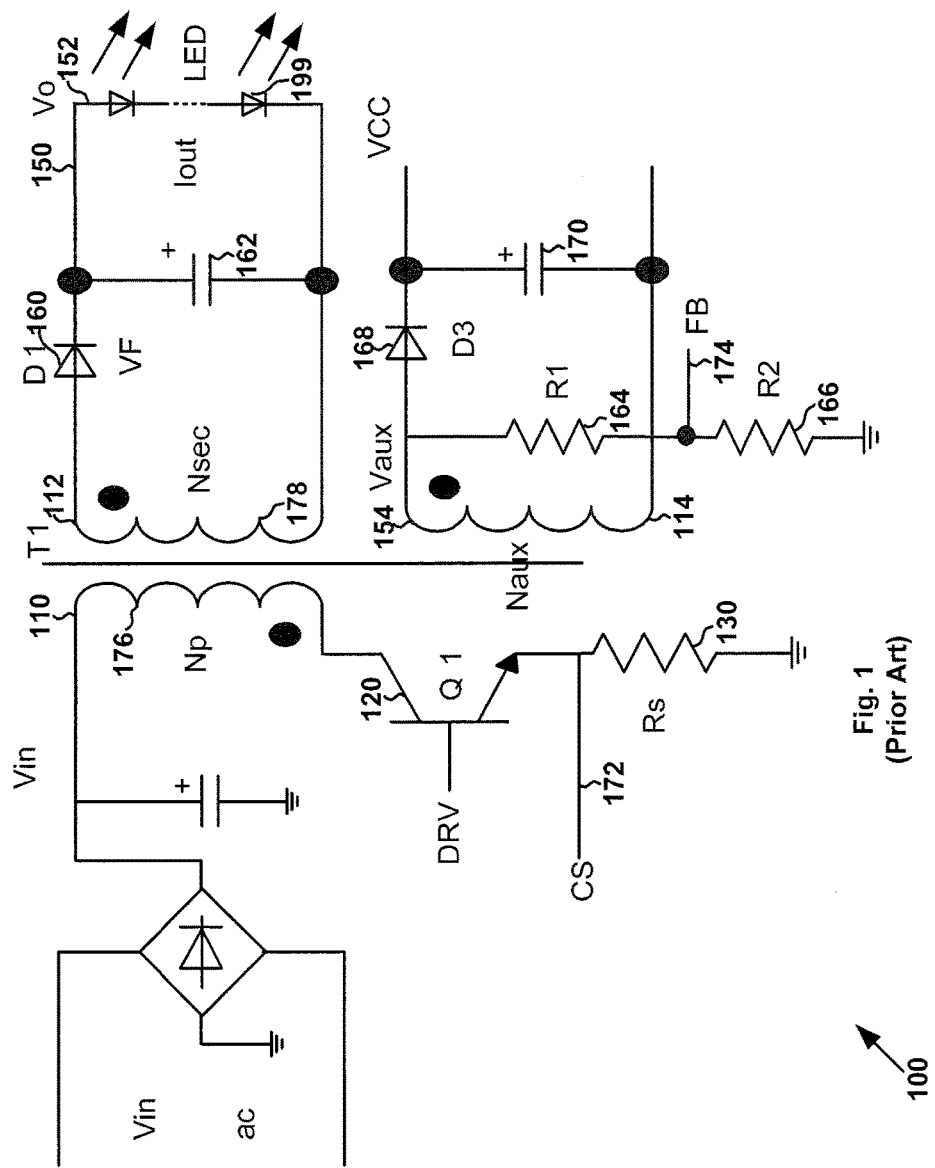
FIG. 1 is a simplified diagram showing a conventional flyback power conversion system.
Figure 2:
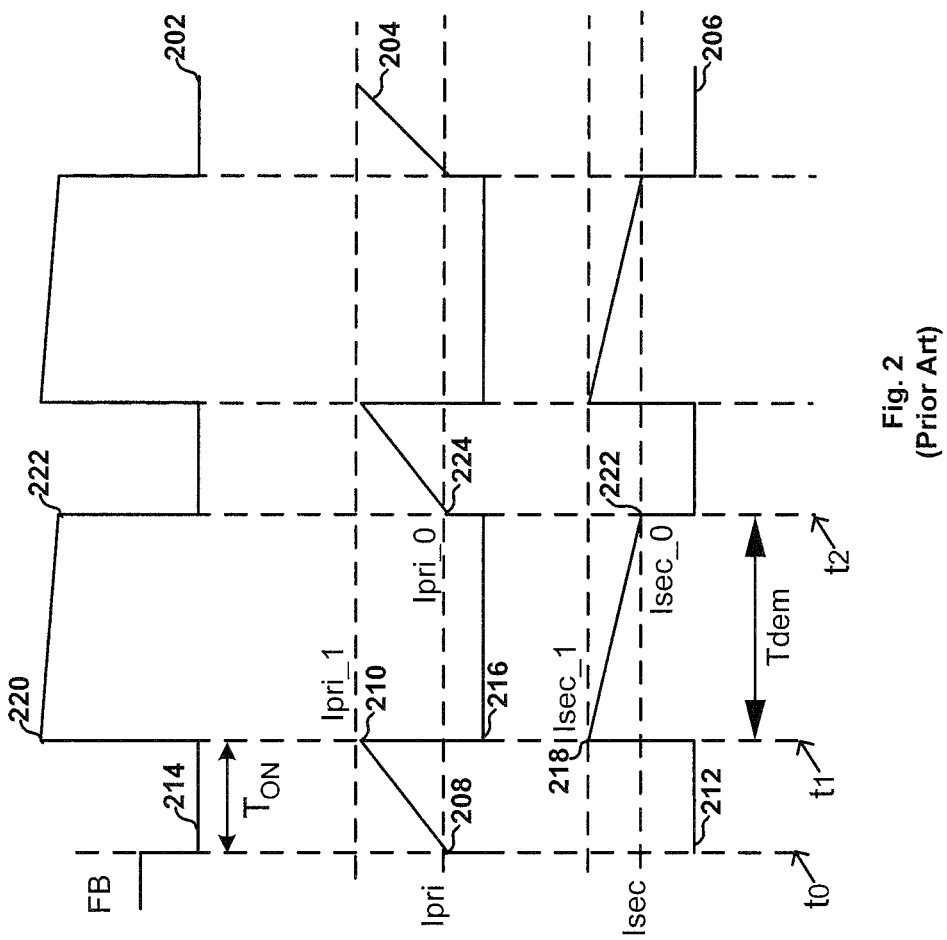
FIG. 2 is a simplified conventional timing diagram for the flyback power conversion system as shown in FIG. 1 that operates in the continuous conduction mode (CCM).
Figure 3A:
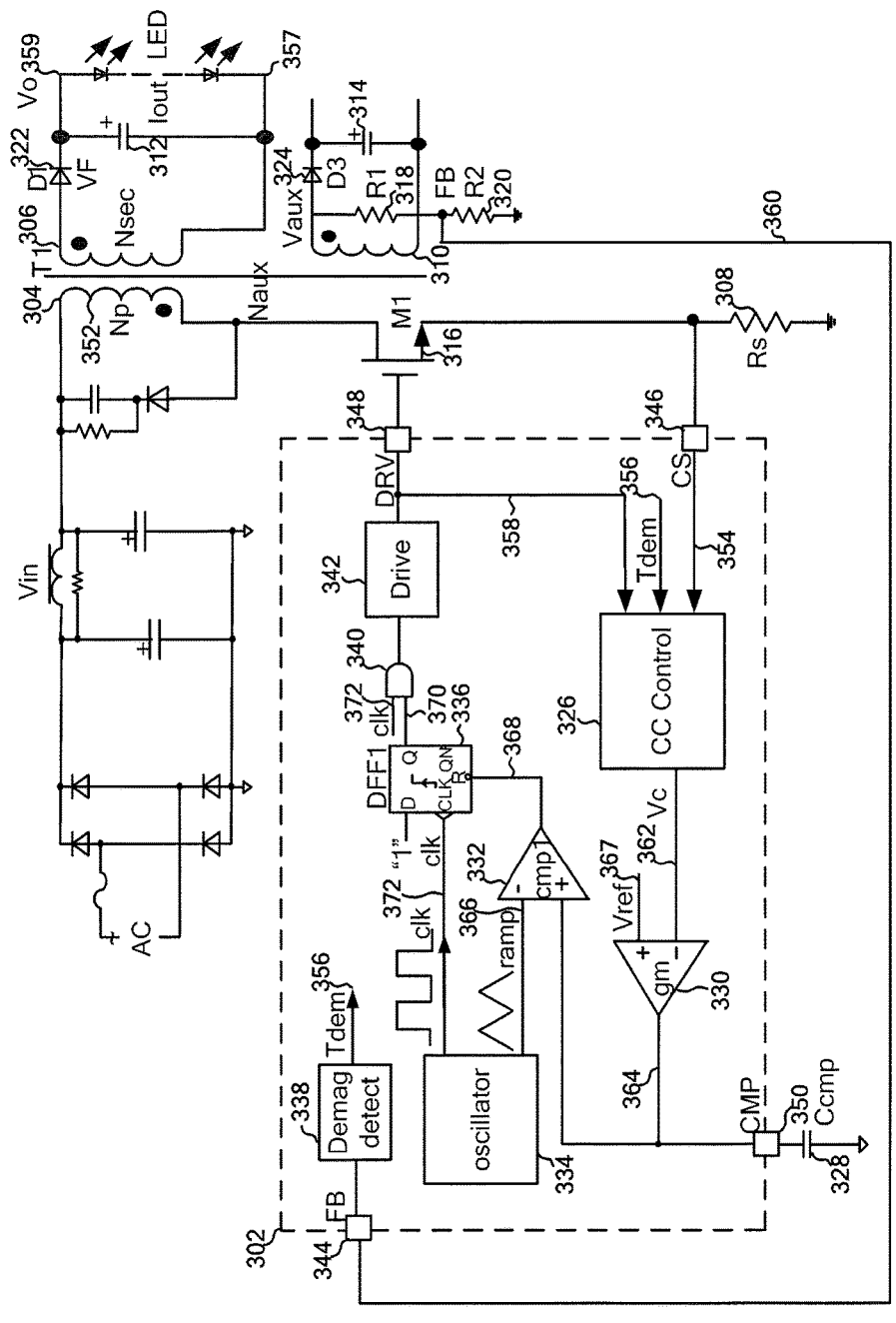
FIG. 3(A) is a simplified diagram showing a power conversion system configured to operate in the continuous conduction mode (CCM) and/or in the discontinuous conduction mode (DCM) according to an embodiment of the present invention.

FIG. 3(A) is a simplified diagram showing a power conversion system configured to operate in the continuous conduction mode (CCM) and/or in the discontinuous conduction mode (DCM) according to an embodiment of the present invention. This diagram is merely an example, which should not unduly limit the scope of the claims. One of ordinary skill in the art would recognize many variations, alternatives, and modifications. The power conversion system 300 includes a controller 302, a primary winding 304, a secondary winding 306, a current sensing resistor 308, an auxiliary winding 310, three capacitors 312, 314 and 328, two resistors 318 and 320, two rectifying diodes 322 and 324, and a power switch 316. The controller 302 includes a current-control component 326, an amplifier 330, a comparator 332, an oscillator 334, a flip-flop component 336, a demagnetization detector 338, an AND gate 340, and a driving component 342. Further, the controller 302 includes terminals 344, 346, 348, and 350. For example, the power switch 316 is a bipolar transistor. In another example, the power switch 316 is a field effect transistor (e.g., a MOSFET).

According to one embodiment, when the power switch 316 is closed (e.g., on), the energy is stored in the transformer including the primary winding 304 and the secondary winding 306. For example, when the power switch 316 is open (e.g., off), the stored energy is released to the output terminal. In another example, the auxiliary winding 310 and associated components (e.g., the resistors 318 and 320) generates a feedback signal 360 which is related to an output voltage 359 on the secondary side. In yet another example, the demagnetization detector 338 receives the feedback signal 360 and outputs a detection signal 356 which indicates when a demagnetization process associated with the transformer including the primary winding 304 and the secondary winding 306 starts and when the demagnetization process ends. In yet another example, the current-control component 326 receives the detection signal 356, a current-sensing signal 354 generated by the resistor 308 and a drive signal 358 generated by the driving component 342, and outputs a signal 362 (e.g., $V_C$) to the amplifier 330. In yet another example, the amplifier 330 and the capacitor 328 are included in an integrator which integrates a difference between the signal 362 and a reference signal 367 and outputs a signal 364. In yet another example, the demagnetization detector 338 also receives the drive signal 358.

According to another embodiment, the comparator 332 receives the signal 364 and a signal 366 generated by the oscillator 334, and outputs a comparison signal 368. For example, if the signal 366 (e.g., a ramp signal) is larger than the signal 364 in magnitude, the comparator 332 generates the comparison signal 368 at a logic low level (e.g., 0). In another example, if the signal 366 (e.g., a ramp signal) is smaller than the signal 364 in magnitude, the comparator 332 generates the comparison signal 368 at a logic high level (e.g., 1). In yet another example, the flip-flop component 336 receives, at a "CLK" terminal, a clock signal 372 generated by the oscillator 334, and receives, at an "R" terminal (e.g., a reset terminal), the comparison signal 368. If the comparison signal 368 is at the logic low level, the flip-flop component 336 outputs a signal 370 at a logic low level (e.g., 0) to the driving component 342 through the AND gate 340 in order to turn off (e.g., open) the switch 316 in some embodiments. For example, if a rising edge appears in the clock signal 372, the flip-flop component 336 generates the signal 370 at a logic high level (e.g., 1) in order to turn on (e.g., close) the switch 316. For example, the signal 366 is a ramp signal associated with a ramping period. In another example, the signal 366 increases from a first magnitude to a second magnitude during a first period in a ramping period, and decreases from the second magnitude to the first magnitude during a second period in the same ramping period. In yet another example, the clock signal 372 has a same frequency as the signal 366. In yet another example, the clock signal 372 has a same phase as the signal 366. In yet another example, if the clock signal 372 is at a logic high level, the signal 366 decreases in magnitude, and if the clock signal 372 is at a logic low level, the signal 366 increases in magnitude.

Figure 3B:
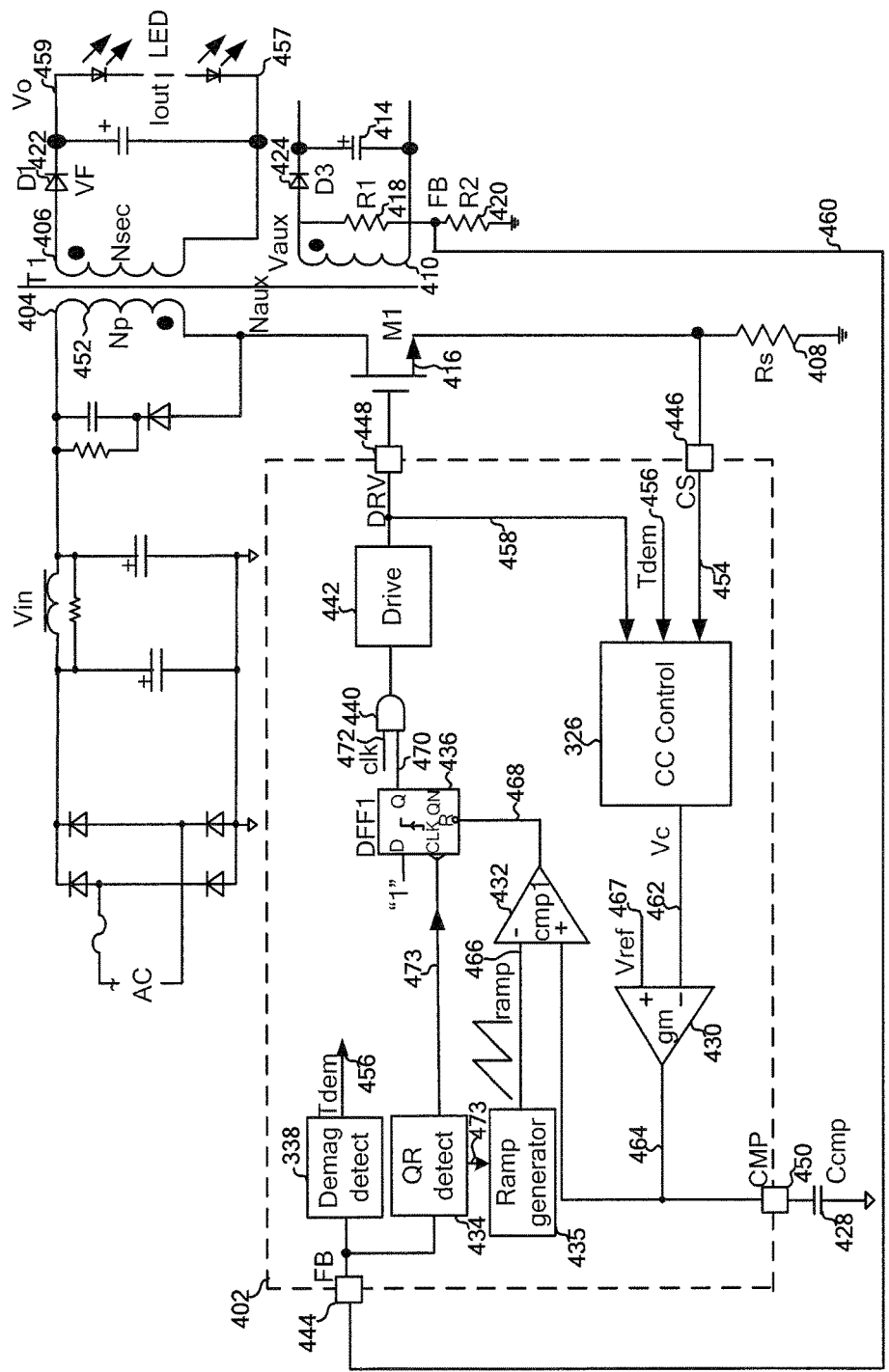
FIG. 3(B) is a simplified diagram showing a power conversion system configured to operate in the critical conduction mode (CRM) according to another embodiment of the present invention.

FIG. 3(B) is a simplified diagram showing a power conversion system configured to operate in the critical conduction mode (CRM) (e.g., the quasi-resonant (QR)

mode) according to another embodiment of the present invention. This diagram is merely an example, which should not unduly limit the scope of the claims. One of ordinary skill in the art would recognize many variations, alternatives, and modifications. The power conversion system 400 includes a controller 402, a primary winding 404, a secondary winding 406, a current sensing resistor 408, an auxiliary winding 410, three capacitors 412, 414 and 428, two resistors 418 and 420, two rectifying diodes 422 and 424, and a power switch 416. The controller 402 includes the current-control component 326, an amplifier 430, a comparator 432, a QR detector 434, a signal generator 435, a flip-flop component 436, the demagnetization detector 338, an AND gate 440, and a driving component 442. Further, the controller 402 includes terminals 444, 446, 448, and 450. For example, the power switch 416 is a bipolar transistor. In another example, the power switch 416 is a field effect transistor (e.g., a MOSFET).

According to one embodiment, when the power switch 416 is closed (e.g., on), the energy is stored in the transformer including the primary winding 404 and the secondary winding 406. For example, when the power switch 416 is open (e.g., off), the stored energy is released to the output terminal. In another example, the auxiliary winding 410 and associated components (e.g., the resistors 418 and 420) generates a feedback signal 460 which is related to an output voltage 459 on the secondary side. In yet another example, the demagnetization detector 338 detects the feedback signal 460 and outputs a detection signal 456 which indicates when a demagnetization process associated with the transformer including the primary winding 404 and the secondary winding 406 starts and when the demagnetization process ends. In yet another example, the current-control component 326 receives the detection signal 456, a current-sensing signal 454 generated by the resistor 408 and a drive signal 458 generated by the driving component 442, and outputs a signal 462 (e.g., $V_C$) to the amplifier 430. In yet another example, the amplifier 430 and the capacitor 428 are included in an integrator which integrates a difference between the signal 462 and a reference signal 467 and outputs a signal 464.

According to another embodiment, the comparator 432 receives the signal 464 and a signal 466 generated by the signal generator 435, and outputs a comparison signal 468. For example, if the signal 466 (e.g., a ramp signal) is larger than the signal 464 in magnitude, the comparator 432 generates the comparison signal 468 at a logic low level (e.g., 0). In another example, if the signal 466 (e.g., a ramp signal) is smaller than the signal 464 in magnitude, the comparator 432 generates the comparison signal 468 at a logic high level (e.g., 1). In yet another example, the QR detector 434 detects whether the system 400 operates in the CRM mode (e.g., the QR mode). In yet another example, the QR detector 434 receives the feedback signal 460 and outputs a signal 473 to the flip-flop component 436 and the signal generator 435. In yet another example, the flip-flop component 436 receives, at a "CLK" terminal, the comparison signal 468 and receives, at an "R" terminal (e.g., a reset terminal), the signal 473.

When the comparison signal 468 is at the logic low level, the flip-flop component 436 outputs a signal 470 at a logic low level (e.g., 0) to the driving component 442 through the AND gate 440 in order to turn off (e.g., open) the switch 416 in some embodiments. For example, if the demagnetization process is determined to be completed, the QR detector 434 generates a rising edge in the signal 473. In response, the flip-flop component 436 generates the signal 472 at the logic high level (e.g., 1) in order to turn on (e.g., close) the switch 416 according to certain embodiments. For example, the signal 466 is a ramp signal associated with a ramping period. In yet another example, the signal 466 increases in magnitude during at least a part of the ramping period. In yet another example, the signal 473 is associated with a signal period, and includes a pulse within the signal period. In yet another example, during a cycle, the signal 466 increases in magnitude when a rising edge of a pulse appears in the signal 473. In yet another example, the signal 466 decreases to a low magnitude abruptly at the end of the cycle. In yet another example, the ramping period of the signal 466 varies from cycle to cycle.

As discussed above and further emphasized here, FIG. 3(A) and FIG. 3(B) are merely examples, which should not unduly limit the scope of the claims. One of ordinary skill in the art would recognize many variations, alternatives, and modifications. For example, the system 300 as shown in FIG. 3(A) and the system 400 as shown in FIG. 3(B) can be combined into one system with overlapping components so that the system can operate in all of the CCM mode, the DCM mode and the CRM mode (e.g., the QR mode).

Referring back to FIG. 3(A), in some embodiments, the bandwidth of the amplifier 330 is far smaller than the switching frequency of the power conversion system 300, for example, if $$\frac{g_m}{2\pi \times C_{cmp}} < \frac{1}{10 T_s}$$

where $g_m$ is the transconductance associated with the amplifier 330, $C_{cmp}$ represents the capacitance of the capacitor 328, and $T_s$ represents the switching period of the system 300. As an example, if the negative feedback loop is established, the difference between the signal 362 and the reference signal 367 is integrated by the integrator including the amplifier 330 and the capacitor 328. In another example, the signal 364 affects the duty cycle of the drive signal 358 and thus affects the power delivered to the output. If an average value of the signal 362 is set approximately equal to the reference signal 367 in magnitude as follows:

$$V_{ref} = \frac{1}{T} \times \int_0^T V_C \, dt = \frac{1}{2 \times T} \times \int_0^T (V_{cs1} + V_{cs0}) \times \frac{T_{dem}}{T_s} \, dt \quad \text{(Equation 8)}$$

or $$V_{ref} = \frac{1}{T} \times \int_0^T V_C \, dt = \frac{1}{T} \times \int_0^T \left( V_{cs\_\frac{1}{2}T_{on}} \right) \times \frac{T_{dem}}{T_s} \, dt \quad \text{(Equation 9)}$$

or $$V_{ref} = \frac{1}{K} \times \sum_1^{K \to \infty} V_C(n) = \frac{1}{K} \times \sum_1^{K \to \infty} V_{cs\_\frac{1}{2}T_{on}}(n) \times \frac{T_{dem}(n)}{T_s(n)} \quad \text{(Equation 10)}$$

where $V_{ref}$ represents the reference signal 367, $V_C$ represents the signal 362, and $$V_{cs\_\frac{1}{2}T_{on}}$$

represents the current sensing signal 354 at the middle point of an on-time period.

For example, the following equation results from combining Equation 8 (or Equation 9) with Equation 6, or combining Equation 10 with Equation 7.

$$I_{out} = N \times \frac{V_{ref}}{R_S}$$ (Equation 11)

Thus, if the reference signal 367 is kept constant in magnitude, the output current 357 is kept approximately constant according to certain embodiments. In some embodiments, the above-discussed current control scheme can be applied to the power conversion system 400 as shown in FIG. 3(B).

Figure 4:
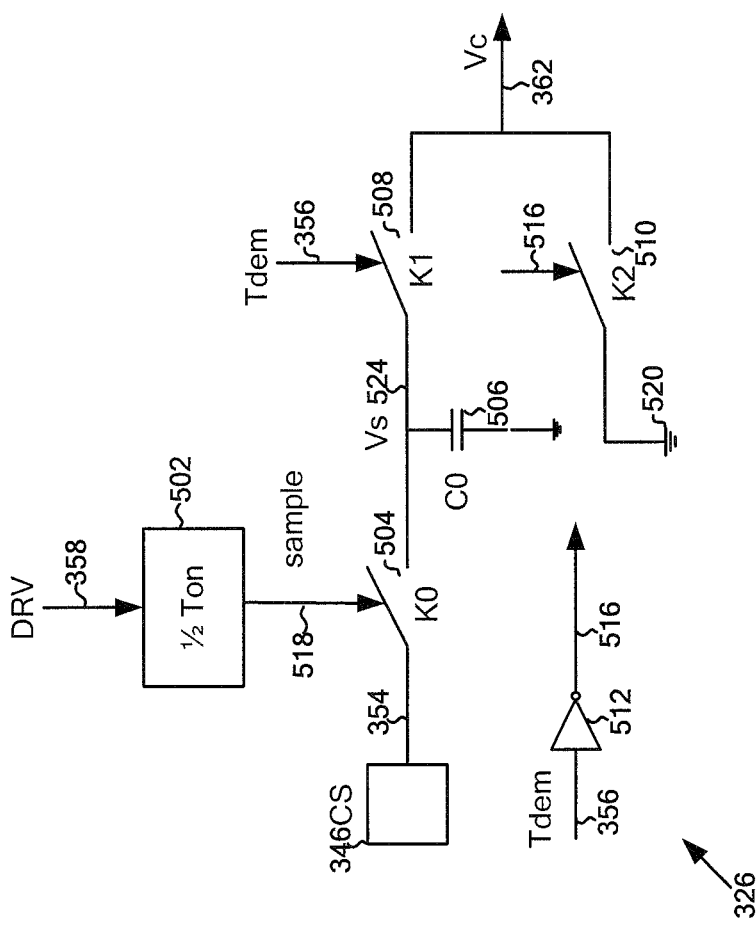
FIG. 4 is a simplified diagram showing certain components of the current-control component as part of the controller as shown in FIG. 3(A) or as part of the controller as shown in FIG. 3(B) according to certain embodiments of the present invention.

FIG. 4 is a simplified diagram showing certain components of the current-control component 326 as part of the controller 302 or as part of the controller 402 according to certain embodiments of the present invention. This diagram is merely an example, which should not unduly limit the scope of the claims. One of ordinary skill in the art would recognize many variations, alternatives, and modifications. The current-control component 326 includes a sampling component 502, three switches 504, 508 and 510, a capacitor 506, and a NOT gate 512.

According to one embodiment, the sampling component 502 receives the drive signal 358 (or the drive signal 458) and generates a sampling signal 518 in order to sample the current sensing signal 354 (or the current sensing signal 454). For example, the current sensing signal 354 (or the current sensing signal 454) is sampled at a middle point of an on-time period. In another example, in response to the sampling signal 518, the switch 504 is closed (e.g., on) or open (e.g., off). In yet another example, when the switch 504 is closed (e.g., on), the capacitor 506 is charged in response to the current sensing signal 354 (or the current sensing signal 454). In yet another example, when the switch 504 is open (e.g., off), the capacitor 506 (e.g., with other related components) provides a voltage signal 524 (e.g., $V_S$) through the switch 508 if the switch 508 is closed (e.g., on) in response to the signal 356 (or the signal 456) during the demagnetization process. That is, the signal 362 (or the signal 462) is approximately equal in magnitude to the voltage signal 524 (e.g., $V_S$) during the demagnetization process. In yet another example, if the demagnetization process has ended, the switch 510 is closed (e.g., on) in response to a signal 516 which is complementary to the signal 356 (or the signal 456), and the signal 362 (or the signal 462) is approximately equal to a ground voltage 520 (e.g., 0).

Figure 5A:
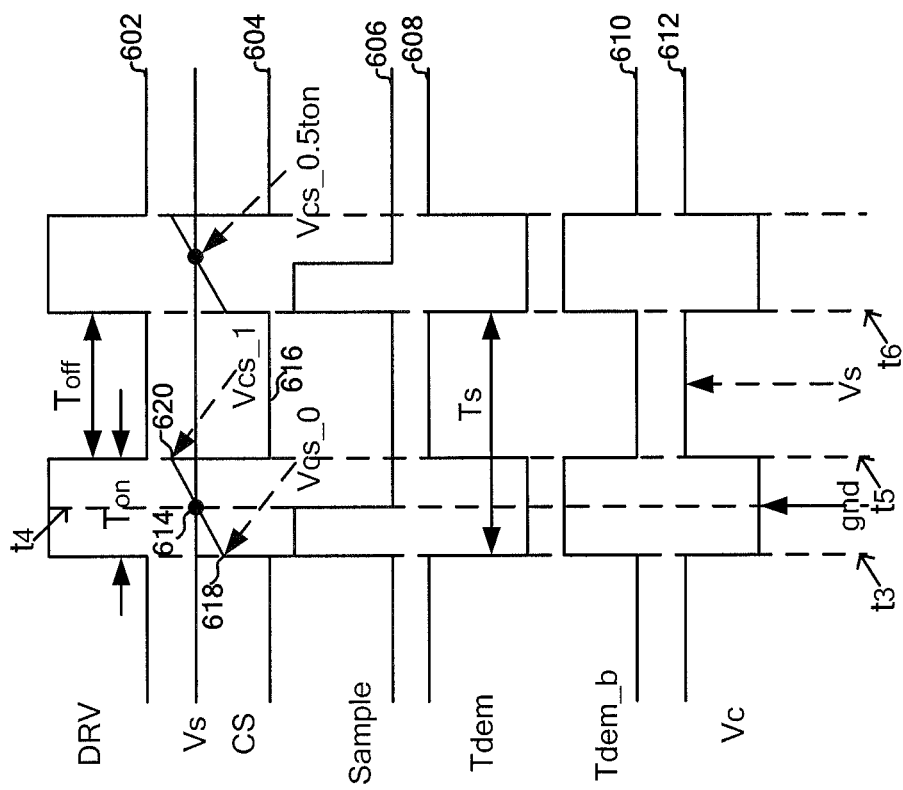
FIG. 5(A) is a simplified timing diagram for the controller as part of the power conversion system as shown in FIG. 3(A) operating in the CCM mode according to one embodiment of the present invention.

FIG. 5(A) is a simplified timing diagram for the controller 302 as part of the power conversion system 300 operating in the CCM mode according to one embodiment of the present invention. This diagram is merely an example, which should not unduly limit the scope of the claims. One of ordinary skill in the art would recognize many variations, alternatives, and modifications. The waveform 602 represents the drive signal 358 as a function of time, the waveform 604 represents the current sensing signal 354 as a function of time, and the waveform 606 represents the sampling signal 518 as a function of time. The waveform 608 represents the signal 356 as a function of time, the waveform 610 represents the signal 516 as a function of time, and the waveform 612 represents the signal 362 (e.g., $V_C$) as a function of time. For example, a switching period, $T_s$, starts at time $t_3$ and ends at time $t_6$, an on-time period, $T_{on}$, starts at the time $t_3$ and ends at time $t_5$, and an off-time period, $T_{off}$, starts at the time $t_5$ and ends at the time $t_6$. In another example, $t_3 \leq t_4 \leq t_5 \leq t_6$.

According to one embodiment, during the on-time period, the drive signal 358 keeps at a logic high level (e.g., as shown by the waveform 602), and the current sensing signal 354 increases (e.g., linearly or non-linearly) in magnitude (e.g., as shown by the waveform 604). For example, the signal 356 is kept at a logic low level which indicates that the system 300 is not in the demagnetization process and the switch 508 keeps open (e.g., off). In another example, before the middle point of the on-time period (e.g., $t_4$), the sampling signal 518 is kept at the logic high level (e.g., as shown by the waveform 604), and in response the switch 504 is closed (e.g., on). In yet another example, the capacitor 506 is charged and the voltage on the capacitor 506 increases in magnitude. In yet another example, at the middle point of the on-time period (e.g., at $t_4$), the sampling signal 518 changes from the logic high level to the logic low level (e.g., a falling edge shown in the waveform 606), and the switch 504 is open (e.g., off). The voltage 524 at the capacitor 506 (e.g., $V_S$) is approximately equal to a magnitude 614 (e.g., the magnitude of the current sensing signal 354 at $t_4$) in some embodiments. For example, the magnitude 614 is approximately equal to an average of a magnitude 618 (e.g., $V_{cs\_0}$) of the current sensing signal 354 at the beginning of the on-time period (e.g., at $t_3$) and a magnitude 620 (e.g., $V_{cs\_1}$) of the current sensing signal 354 at the end of the on-time period (e.g., at $t_5$). In another example, during the on-time period, the signal 516 keeps at the logic high level (e.g., as shown by the waveform 610) and the switch 510 is closed (e.g., on). In yet another example, the signal 362 (e.g., $V_C$) is approximately equal to the ground voltage 520 (e.g., as shown by the waveform 612).

According to another embodiment, at the beginning of the off-time period (e.g., $t_5$), the drive signal 358 changes from the logic high level to the logic low level (e.g., as shown by the waveform 602), and the current sensing signal 354 decreases to a magnitude 616 (e.g., as shown by the waveform 604). For example, the sampling signal 518 keeps at the logic low level and the switch 504 keeps open (e.g., off). In another example, the signal 356 changes from the logic low level to the logic high level which indicates that the demagnetization process begins and the switch 508 is closed (e.g., on). In yet another example, the signal 362 (e.g., $V_C$) changes from the ground voltage to be approximately equal to the voltage 524 at the capacitor 506 (e.g., $V_S$) as shown by the waveform 612. In yet another example, at the end of the off-time period (e.g., at $t_6$), the signal 356 changes from the logic high level to the logic low level which indicates that the demagnetization process ends and thereafter a new switching cycle begins.

Figure 5B:
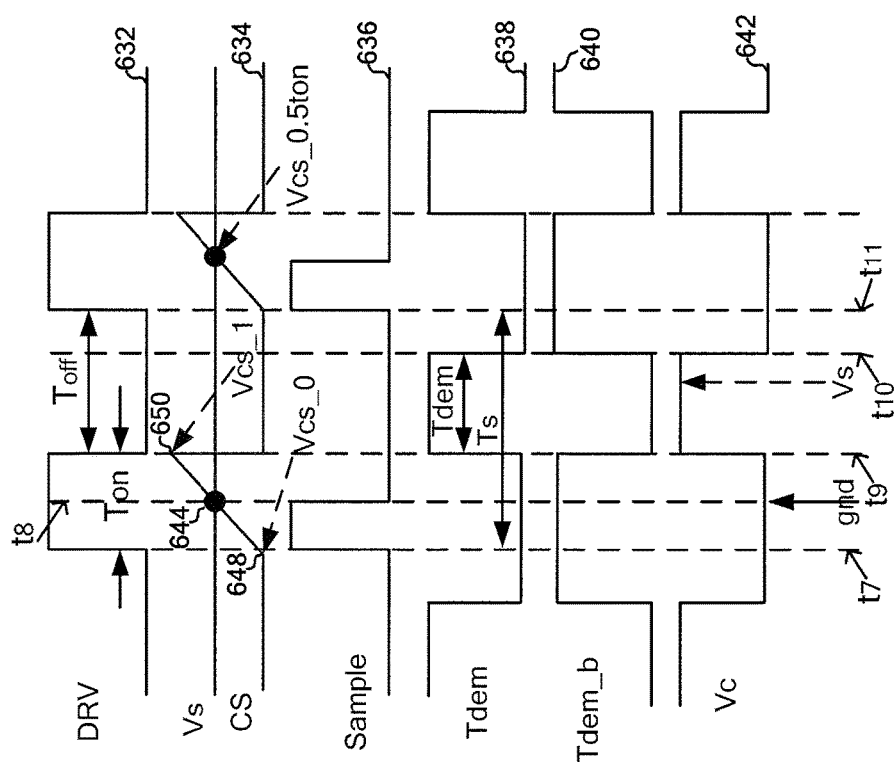
FIG. 5(B) is a simplified timing diagram for the controller as part of the power conversion system as shown in FIG. 3(A) operating in the DCM mode according to another embodiment of the present invention.

FIG. 5(B) is a simplified timing diagram for the controller 302 as part of the power conversion system 300 operating in the DCM mode according to another embodiment of the present invention. This diagram is merely an example, which should not unduly limit the scope of the claims. One of ordinary skill in the art would recognize many variations, alternatives, and modifications. The waveform 632 represents the drive signal 358 as a function of time, the waveform 634 represents the current sensing signal 354 as a function of time, and the waveform 636 represents the sampling signal 518 as a function of time. The waveform 638 represents the signal 356 as a function of time, the waveform 640 represents the signal 516 as a function of time, and the waveform 642 represents the signal 362 (e.g., $V_C$) as a function of time. For example, a switching period, $T_s$, starts at time $t_7$ and ends at time $t_{11}$, an on-time period, $T_{on}$, starts at the time $t_7$ and ends at time $t_9$, a demagnetization time period, $T_{dem}$, starts at the time $t_9$ and ends at time $t_{10}$, and an off-time period, $T_{off}$, starts at the time $t_9$ and ends at the time $t_{11}$. In another example, $t_7 \leq t_8 \leq t_9 \leq t_{10} \leq t_{11}$.

According to one embodiment, during the on-time period, the drive signal 358 keeps at a logic high level (e.g., as shown by the waveform 632), and the current sensing signal 354 increases (e.g., linearly or non-linearly) in magnitude (e.g., as shown by the waveform 634). For example, the signal 356 is kept at a logic low level which indicates that the system 300 is not in the demagnetization process and the switch 508 keeps open (e.g., off). In another example, before the middle point of the on-time period (e.g., $t_8$), the sampling signal 518 is kept at the logic high level (e.g., as shown by the waveform 634), and in response the switch 504 is closed (e.g., on). In yet another example, the capacitor 506 is charged and the voltage on the capacitor 506 increases in magnitude. In yet another example, at the middle point of the on-time period (e.g., at $t_8$), the sampling signal 518 changes from the logic high level to the logic low level (e.g., a falling edge shown in the waveform 636), and the switch 504 is open (e.g., off). The voltage 524 at the capacitor 506 (e.g., $V_S$) is approximately equal to a magnitude 644 (e.g., the magnitude of the current sensing signal 354 at $t_8$) in some embodiments. For example, the magnitude 644 is approximately equal to an average of a magnitude 648 (e.g., $V_{cs\_0}$) of the current sensing signal 354 at the beginning of the on-time period (e.g., at $t_7$) and a magnitude 650 (e.g., $V_{cs\_1}$) of the current sensing signal 354 at the end of the on-time period (e.g., at $t_9$). In another example, during the on-time period, the signal 516 keeps at the logic high level (e.g., as shown by the waveform 640) and the switch 510 is closed (e.g., on). In yet another example, the signal 362 (e.g., $V_C$) is approximately equal to the ground voltage 520 (e.g., as shown by the waveform 642).

According to another embodiment, at the beginning of the off-time period (e.g., $t_9$), the drive signal 358 changes from the logic high level to the logic low level (e.g., as shown by the waveform 632), and the current sensing signal 354 decreases to a magnitude 616 (e.g., as shown by the waveform 634). For example, the sampling signal 518 keeps at the logic low level and the switch 504 keeps open (e.g., off). In another example, the signal 356 changes from the logic low level to the logic high level which indicates that the demagnetization process begins and the switch 508 is closed (e.g., on). In yet another example, the signal 362 (e.g., $V_C$) changes from the ground voltage to be approximately equal to the voltage 524 at the capacitor 506 (e.g., $V_S$) as shown by the waveform 642. In yet another example, the off-time period ends (e.g., at $t_{11}$) a time period after the demagnetization process has completed and thereafter a new switching cycle begins.

Figure 5C:
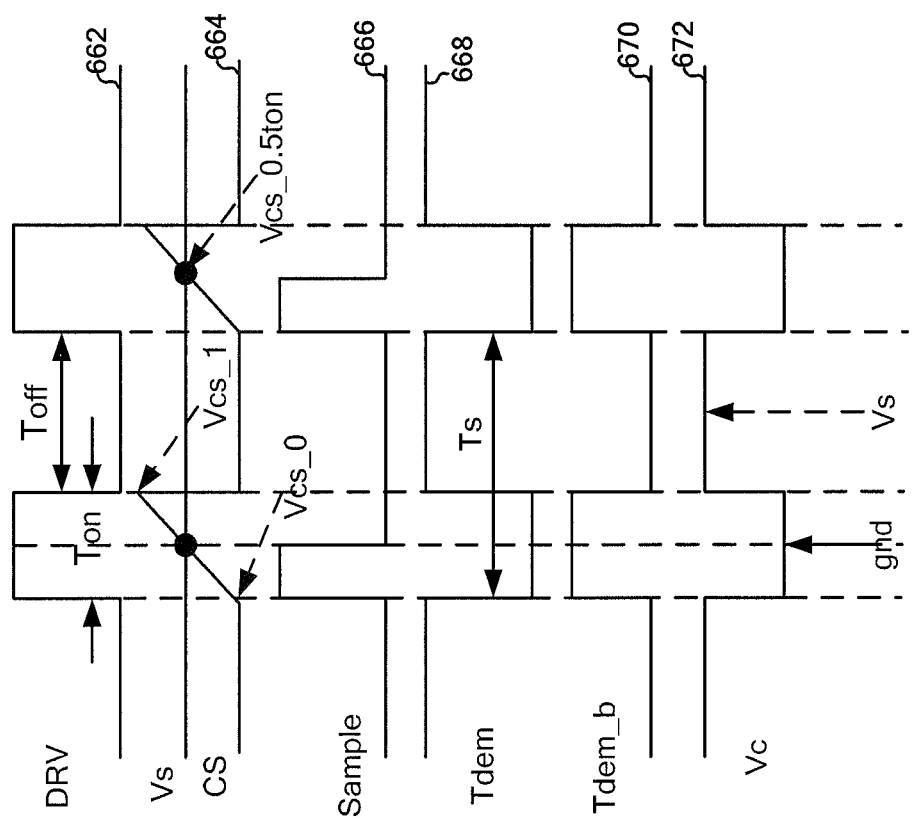
FIG. 5(C) is a simplified timing diagram for the controller as part of the power conversion system as shown in FIG. 3(B) operating in the CRM mode according to an embodiment of the present invention.

FIG. 5(C) is a simplified timing diagram for the controller 402 as part of the power conversion system 400 operating in the CRM mode (e.g., the QR mode) according to an embodiment of the present invention. This diagram is merely an example, which should not unduly limit the scope of the claims. One of ordinary skill in the art would recognize many variations, alternatives, and modifications. The waveform 662 represents the drive signal 458 as a function of time, the waveform 664 represents the current sensing signal 454 as a function of time, and the waveform 666 represents the sampling signal 518 as a function of time. The waveform 668 represents the signal 456 as a function of time, the waveform 670 represents the signal 516 as a function of time, and the waveform 672 represents the signal 462 (e.g., $V_C$) as a function of time. In some embodiments, the scheme of using the sampling signal 518 to sample the current sensing signal 454 at a middle point of an on-time period in the QR mode as shown in FIG. 5(C) is similar to the schemes demonstrated in FIG. 5(A) and FIG. 5(B).

Referring to FIG. 5(A), FIG. 5(B) and FIG. 5(C), the signal 362 (or the signal 462) can be determined as follows, for example.

$$V_C = \frac{1}{T_s} \times (V_s \times T_{dem} + 0 \times T_{dem\_b}) = \quad \text{(Equation 12)}$$

$$V_{cs\_\frac{1}{2}T_{on}} \times \frac{T_{dem}}{T_s} = \frac{V_{cs1} + V_{cs0}}{2} \times \frac{T_{dem}}{T_s}$$

where $V_C$ represents the signal 362 (or the signal 462), $V_s$ represents the voltage signal 524, $T_s$ represents the duration of a switching period, $T_{dem}$ represents the duration of the demagnetization period, and $T_{dem\_b}$ represents the duration of the switching period excluding the demagnetization period. In addition, $$V_{cs\_\frac{1}{2}T_{on}}$$

represents a magnitude of the current sensing signal 354 (or the current sensing signal 454) at the middle point of an on-time period, $V_{cs0}$ represents a magnitude of the current sensing signal 354 (or the current sensing signal 454) at the beginning of the on-time period, and $V_{cs1}$ represents a magnitude of the current sensing signal 354 (or the current sensing signal 454) at the end of the on-time period.

Figure 6:
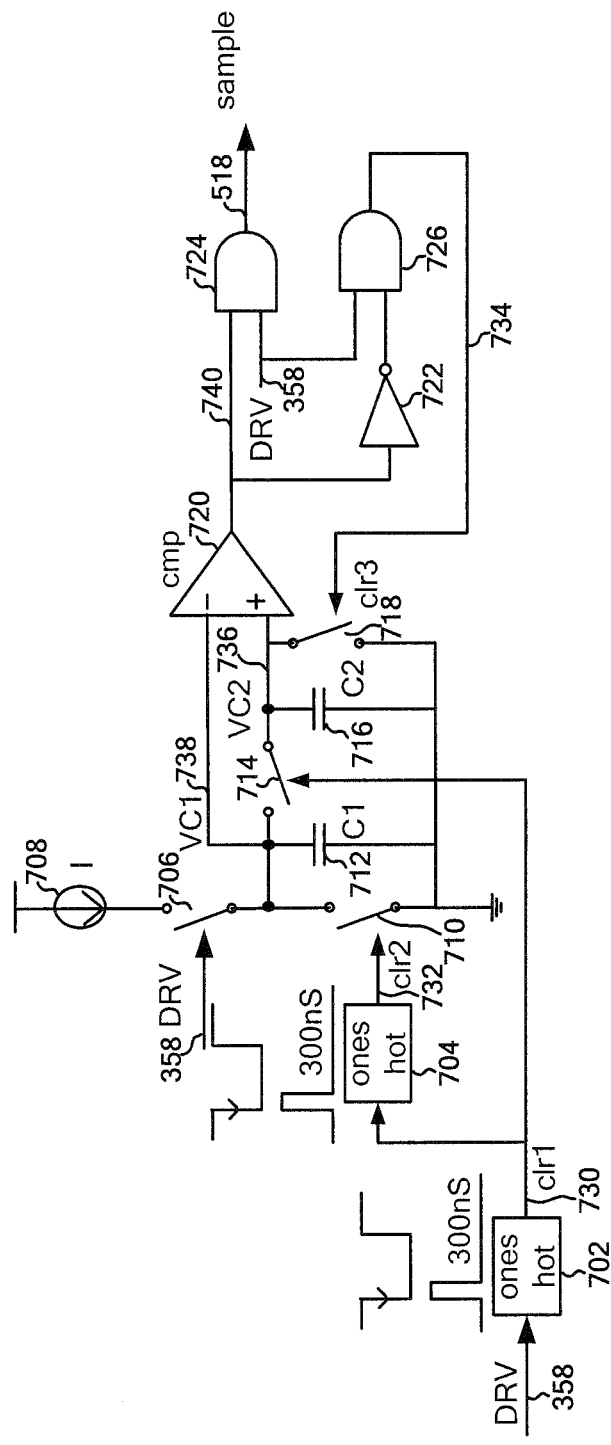
FIG. 6 is a simplified diagram showing certain components of the sampling component as part of the current-control component of the controller as shown in FIG. 3(A) or the controller as shown in FIG. 3(B) according to certain embodiments of the present invention.

FIG. 6 is a simplified diagram showing certain components of the sampling component 502 as part of the current-control component 326 of the controller 302 or the controller 402 according to certain embodiments of the present invention. This diagram is merely an example, which should not unduly limit the scope of the claims. One of ordinary skill in the art would recognize many variations, alternatives, and modifications. The sampling component 502 includes two one-shot signal generators 702 and 704, four switches 706, 710, 714 and 718, two capacitors 712 and 716, a comparator 720, a NOT gate 722, two AND gates 724 and 726, and a current source 708.

According to one embodiment, the one-shot signal generator 702 receives the drive signal 358 (or the drive signal 458) and generates a signal 730 (e.g., clr1) which affects the status of the switch 714. For example, the one-shot signal generator 704 receives the signal 730 (e.g., clr1) and outputs a signal 732 which affects the status of the switch 710. In another example, the drive signal 358 (or the drive signal 458) affects the status of the switch 706. In yet another example, the capacitor 712 generates a voltage signal 738 when the switch 706 is closed (e.g., on). In yet another example, when being charged, the capacitor 714 generates a voltage signal 736. In yet another example, the comparator 720 receives the signal 736 and the signal 738 and outputs a comparison signal 740 to the AND gate 724 and the NOT gate 722 in order to generate the sampling signal 518. In yet another example, the AND gate 726 outputs a signal 734 to affect the status of the switch 718.

Figure 7:
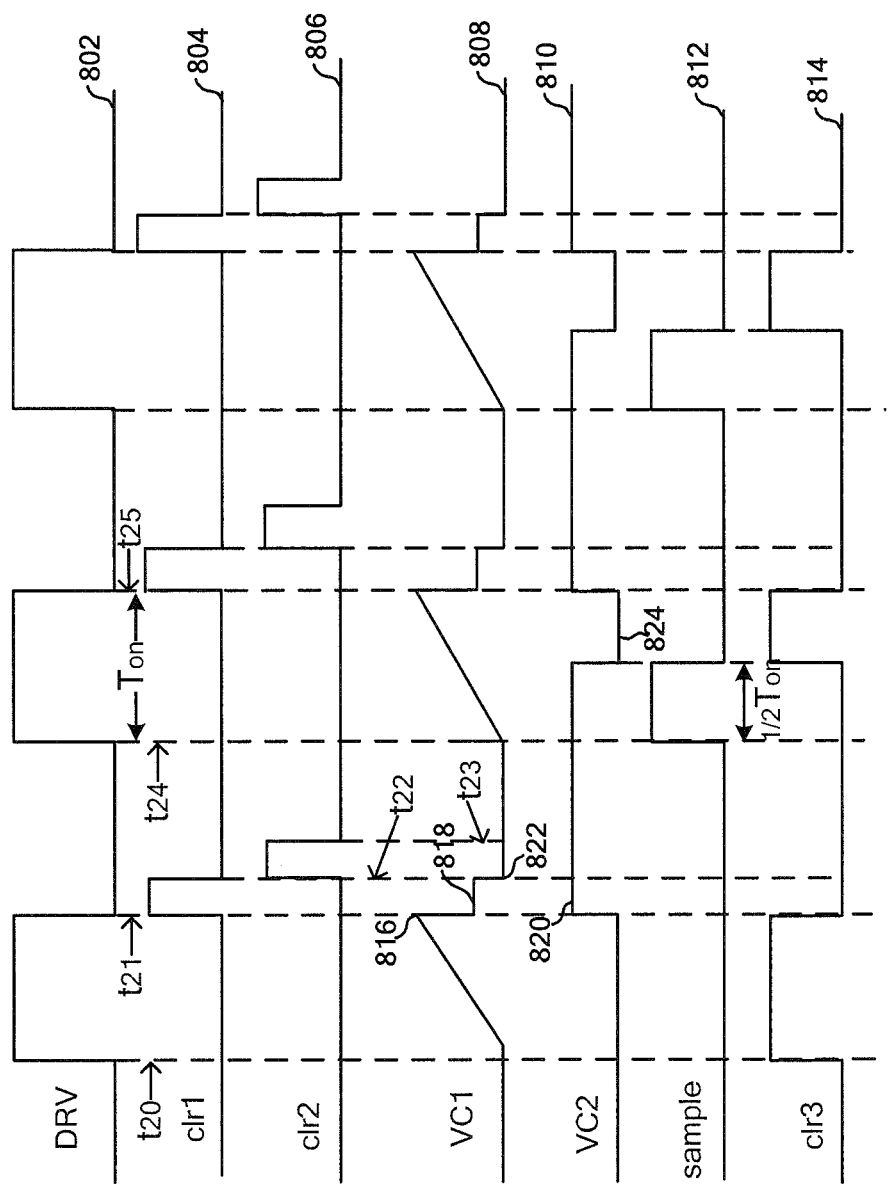
FIG. 7 is a simplified timing diagram for the sampling component as part of the current-control component of the controller as shown in FIG. 3(A) or the controller as shown in FIG. 3(B) according to some embodiments of the present invention.

FIG. 7 is a simplified timing diagram for the sampling component 502 as part of the current-control component 326 of the controller 302 or the controller 402 according to some embodiments of the present invention. This diagram is merely an example, which should not unduly limit the scope of the claims. One of ordinary skill in the art would recognize many variations, alternatives, and modifications. The waveform 802 represents the drive signal 358 (or the drive signal 458) as a function of time, the waveform 804 represents the signal 730 as a function of time, and the waveform 806 represents the signal 732 as a function of time. The waveform 808 represents the signal 738 as a function of time, the waveform 810 represents the signal 736 as a function of time, the waveform 812 represents the sampling signal 518 as a function of time, and the waveform 814 represents the signal 734 as a function of time.

According to one embodiment, during a time period between time $t_{20}$ and time $t_{21}$, the drive signal 358 (or the drive signal 458) keeps at a logic high level (e.g., as shown by the waveform 802). For example, the signal 730 (e.g., clr1) and the signal 732 (e.g., clr2) keep at a logic low level (e.g., as shown by the waveform 804 and the waveform 806, respectively), and in response the switch 714 and the switch 710 are open (e.g., off) respectively. In another example, the switch 706 is closed (e.g., on) in response to the drive signal 358 (or the drive signal 458). In yet another example, the capacitor 712 is charged and the voltage signal 738 (e.g., $V_{C1}$) increases in magnitude (e.g., as shown by the waveform 808).

According to another embodiment, at the time $t_{21}$, the drive signal 358 (or the drive signal 458) changes from the logic high level to the logic low level (e.g., a falling edge as shown by the waveform 802) and the switch 706 is open (e.g., off). For example, the one-shot signal generator 702 generates a pulse (e.g., with a pulse width between $t_{21}$ and $t_{22}$) in the signal 730 (e.g., chi) as shown by the waveform 804. In another example, in response, the switch 714 is closed (e.g., on) and the capacitor 712 begins to discharge. In yet another example, the signal 738 (e.g., $V_{C1}$) decreases from a magnitude 816 to a magnitude 818, and the signal 736 (e.g., $V_{C2}$) increases to a magnitude 820. In yet another example, the magnitude 818 is equal to the magnitude 820. In yet another example, if the capacitance of the capacitor 712 and the capacitance of the capacitor 716 are equal, then the magnitude 818 and the magnitude 820 are each equal to one half of the magnitude 816.

According to yet another embodiment, at the time $t_{22}$, the signal 730 changes to the logic low level (e.g., a falling edge as shown by the waveform 804). For example, the switch 714 is open (e.g., off). In another example, the one-shot signal generator 704 generates a pulse (e.g., with a pulse width between $t_{22}$ and $t_{23}$) in the signal 732 (e.g., clr2) as shown by the waveform 806. In another example, in response, the switch 710 is closed (e.g., on) and the capacitor 712 is discharged. In yet another example, the signal 738 decreases to a magnitude 822 (e.g., 0) as shown by the waveform 808), and the signal 736 keeps at the magnitude 820 (e.g., as shown by the waveform 810).

In one embodiment, at the beginning of a next switching cycle (e.g., at time $t_{24}$), the drive signal 358 (or the drive signal 458) changes from the logic low level to the logic high level (e.g., as shown by the waveform 802). For example, in response, the switch 706 is closed (e.g., on). In another example, the capacitor 712 is charged again and the voltage signal 738 (e.g., $V_{C1}$) increases in magnitude (e.g., as shown by the waveform 808). In yet another example, if the signal 738 is smaller in magnitude than the signal 736, the comparator 720 generates the comparison signal 740 at a logic high level (e.g., 1). In yet another example, if the signal 738 becomes larger in magnitude than the signal 736 (e.g., at $t_{25}$, the middle point of the on-time period), the comparator 720 changes the comparison signal 740 to a logic low level (e.g., 0). In yet another example, the AND gate 724 receives the comparison signal 740 and the drive signal 358 (or the drive signal 458) and outputs the sampling signal 518. That is, the sampling signal 518 is equal to a logic sum of the comparison signal 740 and the drive signal 358 (or the drive signal 458). In yet another example, when the comparison signal 740 is changed to the logic low level, the AND gate 726 changes the signal 734 in order to close (e.g., turn on) the switch 718, and in response the capacitor 716 is discharged. In yet another example, the signal 736 decreases to a low magnitude 824 (e.g., at $t_{25}$, the middle point of the on-time period) as shown by the waveform 810.

Figure 8A:
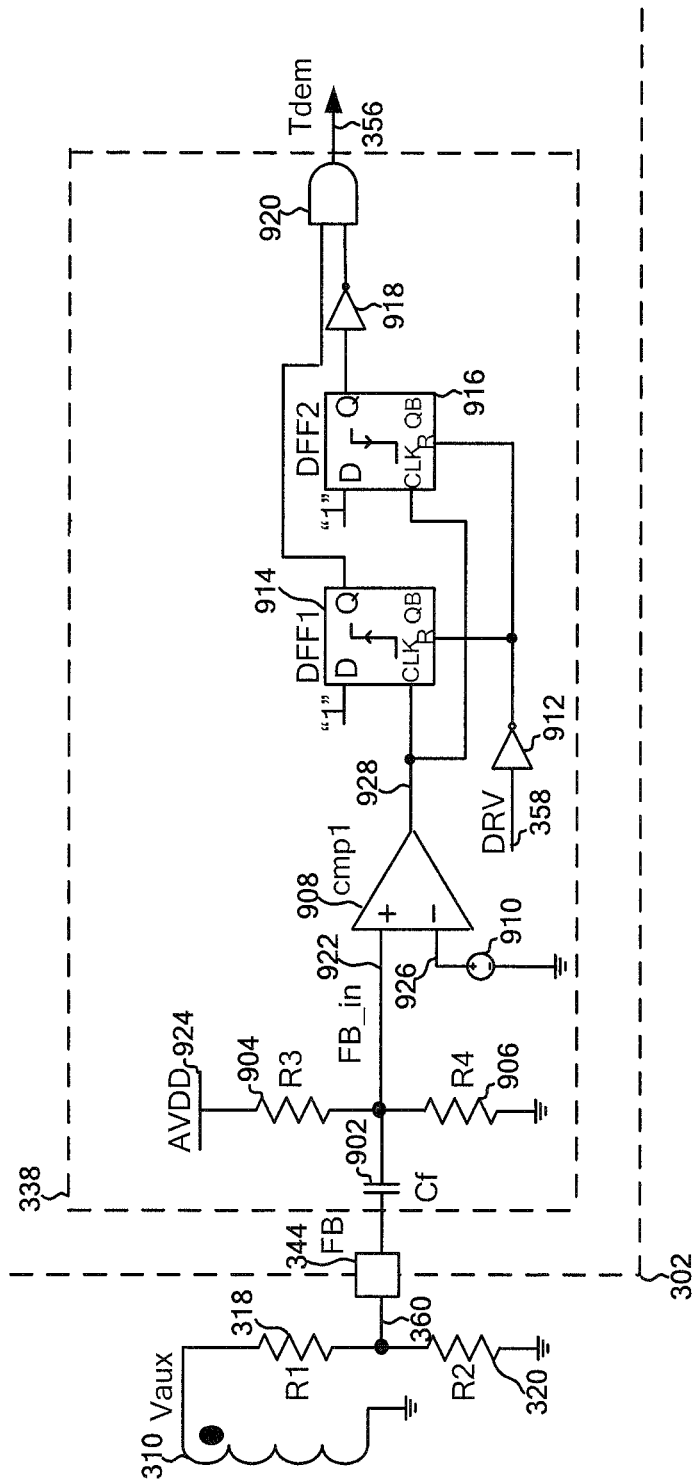
FIG. 8(A) is a simplified diagram showing certain components of the demagnetization detector as part of the controller as shown in FIG. 3(A) or the controller as shown in FIG. 3(B) according to certain embodiments of the present invention.

FIG. 8(A) is a simplified diagram showing certain components of the demagnetization detector 338 as part of the controller 302 or as part of the controller 402 according to certain embodiments of the present invention. This diagram is merely an example, which should not unduly limit the scope of the claims. One of ordinary skill in the art would recognize many variations, alternatives, and modifications. The demagnetization detector 338 includes a capacitor 902, two resistors 904 and 906, a comparator 908, an offset component 910, two NOT gates 912 and 918, two flip-flop components 914 and 916, and an AND gate 920.

According to one embodiment, the feedback signal 360 (or the feedback signal 460) is received at the capacitor 902. For example, a knee point of the feedback signal 360 (or the feedback signal 460) that indicates the end of the demagnetization process is detected using a differential circuit including the capacitor 902 and the resistors 904 and 906. In another example, a signal 922 is generated to be equal to a differentiated signal related to the slope of the feedback signal 360 (or the feedback signal 460) plus a direct-current (DC) offset $V_m$. In yet another example, the DC offset $V_m$ is determined based on the following equation.

$$V_m = AVDD \times \frac{R_4}{R_3 + R_4} \qquad \text{(Equation 13)}$$

where $V_m$ represents the DC offset, AVDD represents a reference voltage 924, $R_3$ represents the resistance of the resistor 904, and $R_4$ represents the resistance of the resistor 906.

According to another embodiment, the comparator 908 receives the signal 922 and a threshold signal 926 (e.g., 0.1 V) generated by the offset component 910 and outputs a comparison signal 928 to the flip-flop components 914 and 916. For example, the drive signal 358 (or the drive signal 458) is processed by the NOT gate 912 in order to affect the flip-flop components 914 and 916. In another example, during the demagnetization process, the signal 922 is no less than the threshold signal 926 in magnitude. In yet another example, if the signal 922 becomes smaller than the threshold signal 926 in magnitude, then the end of the demagnetization process is detected. In yet another example, the comparator 908 changes the comparison signal 928 in order to change the detection signal 356 (or the detection signal 456).

As discussed above and further emphasized here, FIG. 8(A) is merely an example, which should not unduly limit the scope of the claims. One of ordinary skill in the art would recognize many variations, alternatives, and modifications. For example, the resistor 904 is replaced by a current source in some embodiments, as shown in FIG. 8(B).

Figure 8B:
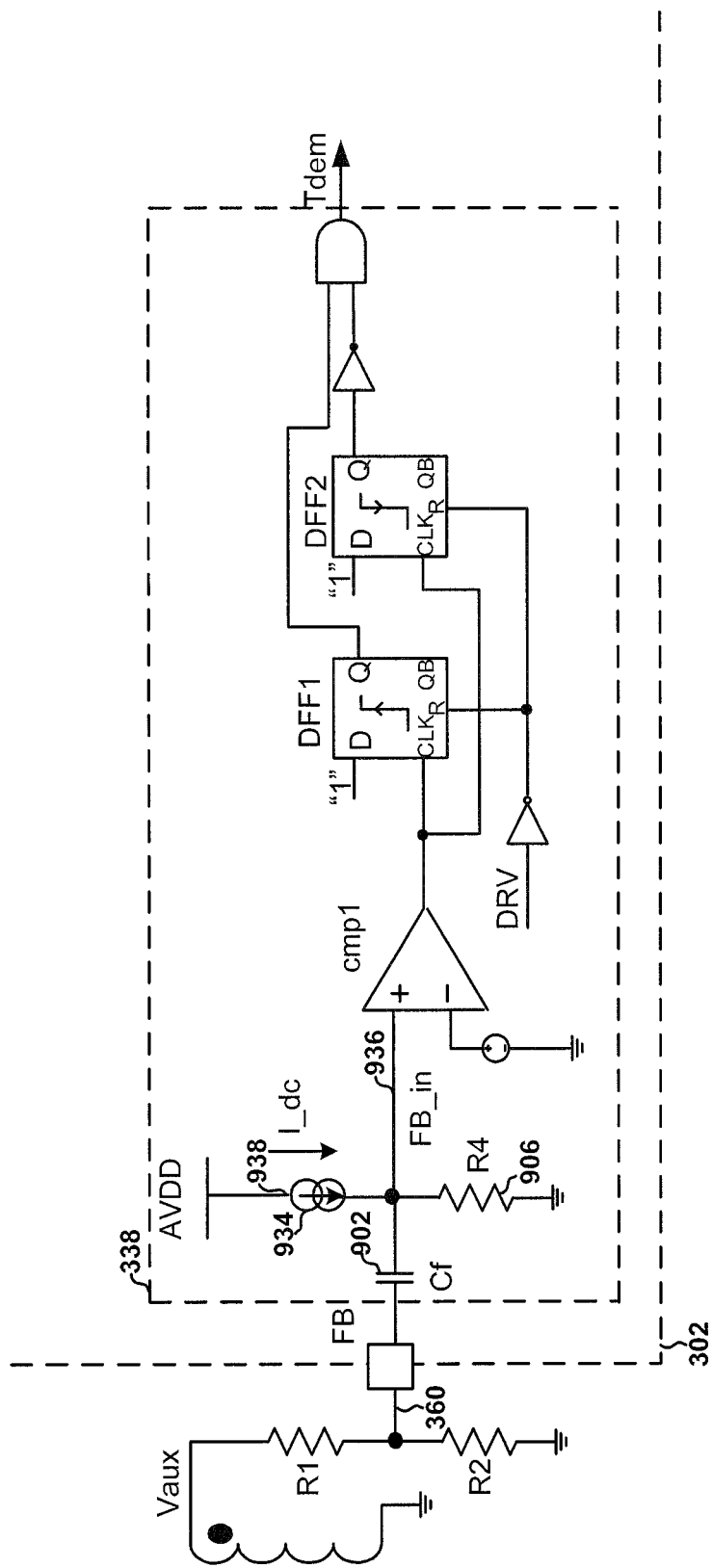
FIG. 8(B) is a simplified diagram showing certain components of the demagnetization detector as part of the controller as shown in FIG. 3(A) or the controller as shown in FIG. 3(B) according to some embodiments of the present invention.

FIG. 8(B) is a simplified diagram showing certain components of the demagnetization detector 338 as part of the controller 302 or as part of the controller 402 according to some embodiments of the present invention. This diagram is merely an example, which should not unduly limit the scope of the claims. One of ordinary skill in the art would recognize many variations, alternatives, and modifications. As shown in FIG. 8(B), the demagnetization detector 338 includes a current source 934, instead of the resistor 904.

According to one embodiment, the feedback signal 360 (or the feedback signal 460) is received at the capacitor 902. For example, a signal 936 is generated, by the differential circuit including the capacitor 902 and the resistors 904 and 906, to be equal to a differentiated signal related to the slope of the feedback signal 360 (or the feedback signal 460) plus a direct-current (DC) offset $V_m$. In another example, the DC offset $V_m$ is determined based on the following equation.

$$V_m = I_{dc} \times R_4 \quad \text{(Equation 14)}$$

where $V_m$ represents the DC offset, $I_{dc}$ represents a current 938 flowing through the resistor 906, and $R_4$ represents the resistance of the resistor 906.

Figure 9:
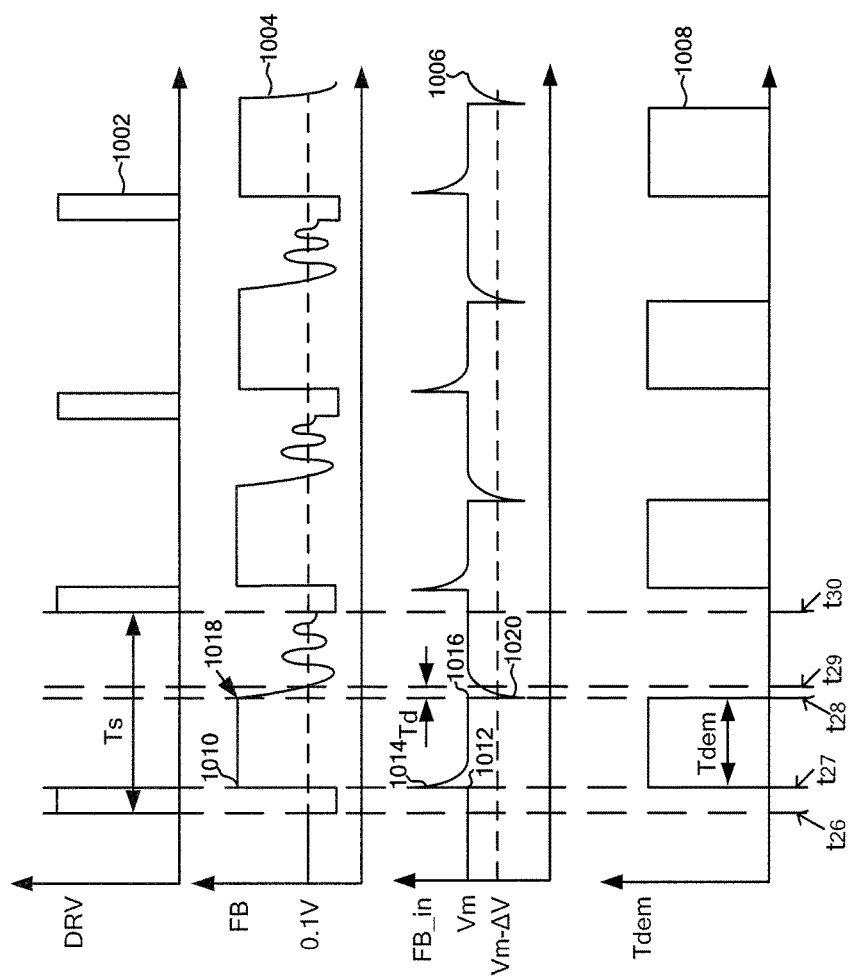
FIG. 9 is a simplified timing diagram for the demagnetization detector as part of the controller as shown in FIG. 3(A) operating in the DCM mode according to certain embodiments of the present invention.

FIG. 9 is a simplified timing diagram for the demagnetization detector 338 as part of the controller 302 operating in the DCM mode according to certain embodiments of the present invention. This diagram is merely an example, which should not unduly limit the scope of the claims. One of ordinary skill in the art would recognize many variations, alternatives, and modifications. The waveform 1002 represents the drive signal 358 as a function of time, the waveform 1004 represents the feedback signal 360 as a function of time, the waveform 1006 represents the signal 922 as a function of time, and the waveform 1008 represents the detection signal 356 as a function of time. For example, a switching period, $T_s$, starts at time $t_{26}$ and ends at time $t_{30}$, an on-time period starts at the time $t_{26}$ and ends at time $t_{27}$, a demagnetization period, $T_{dem}$, starts at the time $t_{27}$ and ends at time $t_{28}$. In another example, $t_{26} \leq t_{27} \leq t_{28} \leq t_{29} \leq t_{30}$.

According to one embodiment, during the on-time period, the drive signal 358 keeps at a logic high level (e.g., as shown by the waveform 1002). For example, the flip-flop components 914 and 916 are reset. In another example, when the drive signal 358 changes from the logic high level to a logic low level at the end of the on-time period (e.g., at $t_{27}$), the feedback signal 360 increases to a magnitude 1010 (e.g., as shown by the waveform 1004), and the signal 922 abruptly increases from a magnitude 1012 to a magnitude 1014 (e.g., a rising edge as shown by the waveform 1006) before gradually decreasing in magnitude. In yet another example, if the signal 922 becomes larger in magnitude than the threshold signal 926, the comparator 908 changes the comparison signal 928. The detection signal 356 changes from the logic low level to the logic high level (e.g., a rising edge as shown in the waveform 1008) which indicates the demagnetization process begins in some embodiments.

According to another embodiment, when the demagnetization process ends (e.g., at $t_{28}$), a knee point 1018 appears in the feedback signal 360 and the feedback signal 360 decreases in magnitude (e.g., as shown by the waveform 1004). For example, the signal 922 abruptly decreases from a magnitude 1016 to a magnitude 1020 (e.g., a falling edge as shown by the waveform 1006). In another example, in response, the comparator changes the comparison signal 928. The detection signal 356 changes from the logic high level to the logic low level (e.g., a falling edge as shown in the waveform 1008) which indicates the demagnetization process ends in some embodiments.

Figure 10:
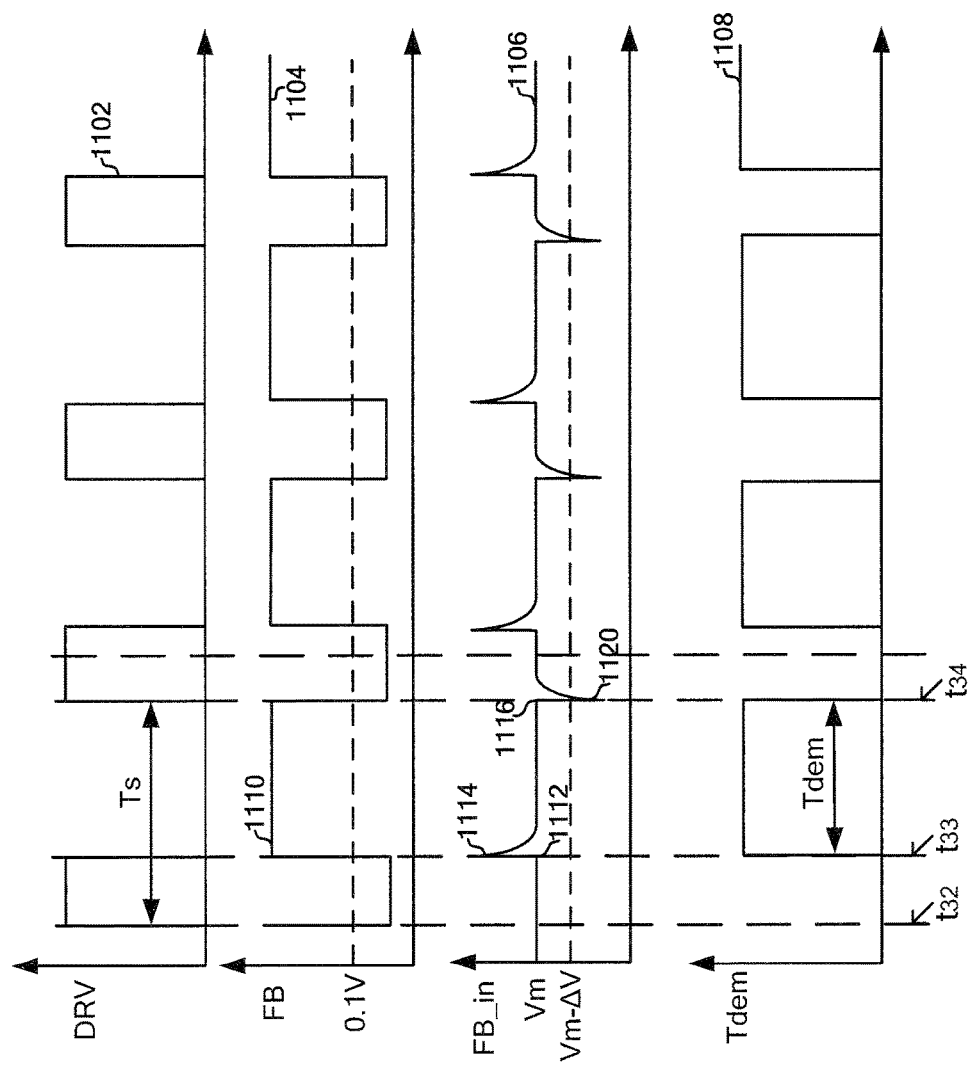
FIG. 10 is a simplified timing diagram for the demagnetization detector as part of the controller as shown in FIG. 3(A) operating in the CCM mode according to some embodiments of the present invention.

FIG. 10 is a simplified timing diagram for the demagnetization detector 338 as part of the controller 302 operating in the CCM mode according to some embodiments of the present invention. This diagram is merely an example, which should not unduly limit the scope of the claims. One of ordinary skill in the art would recognize many variations, alternatives, and modifications. The waveform 1102 represents the drive signal 358 as a function of time, the waveform 1104 represents the feedback signal 360 as a function of time, the waveform 1106 represents the signal 922 as a function of time, and the waveform 1108 represents the detection signal 356 as a function of time. For example, a switching period, $T_s$, starts at time $t_{32}$ and ends at time $t_{34}$, an on-time period starts at the time $t_{32}$ and ends at time $t_{33}$, a demagnetization period, $T_{dem}$, starts at the time $t_{33}$ and ends at time $t_{34}$. In another example, $t_{32} \leq t_{33} \leq t_{34}$.

According to one embodiment, during the on-time period, the drive signal 358 keeps at a logic high level (e.g., as shown by the waveform 1102). For example, the flip-flop components 914 and 916 are reset. In another example, when the drive signal 358 changes from the logic high level to a logic low level at the end of the on-time period (e.g., at $t_{33}$), the feedback signal 360 increases to a magnitude 1110 (e.g., as shown by the waveform 1104), and the signal 922 abruptly increases from a magnitude 1112 to a magnitude 1114 (e.g., a rising edge as shown by the waveform 1106) before gradually decreasing in magnitude. In yet another example, if the signal 922 becomes larger in magnitude than the threshold signal 926, the comparator 908 changes the comparison signal 928. The detection signal 356 changes from the logic low level to the logic high level (e.g., a rising edge as shown in the waveform 1108) which indicates the demagnetization process begins in some embodiments.

According to another embodiment, when the demagnetization process ends (e.g., at $t_{34}$), the feedback signal 360 decreases in magnitude (e.g., as shown by the waveform 1104). For example, the signal 922 abruptly decreases from a magnitude 1116 to a magnitude 1120 (e.g., a falling edge as shown by the waveform 1106). In another example, in response, the comparator changes the comparison signal 928. The detection signal 356 changes from the logic high level to the logic low level (e.g., a falling edge as shown in the waveform 1108) which indicates the demagnetization process ends in some embodiments. In yet another example, in the CCM mode, the off-time period is approximately equal in duration to the demagnetization period, and a next switching cycle starts right after the demagnetization period ends.

As discussed above and further emphasized here, FIG. 9 and FIG. 10 are merely examples, which should not unduly limit the scope of the claims. One of ordinary skill in the art would recognize many variations, alternatives, and modifications. For example, the schemes illustrated in FIG. 9 and FIG. 10 using the demagnetization detector 338 as part of the controller 302 operating in the DCM mode and in the CCM mode respectively can also be applied to the demagnetization detector 338 as part of the controller 402 operating in the CRM mode (e.g., the QR mode).

According to another embodiment, a system controller for regulating an output current of a power conversion system includes a driving component, a demagnetization detector, a current-regulation component and a signal processing component. The driving component is configured to output a drive signal to a switch in order to affect a primary current flowing through a primary winding of the power conversion system, the drive signal being associated with at least a switching period, the switching period including an on-time period and a demagnetization period. The demagnetization detector is configured to receive a feedback signal associated with an output voltage of the power conversion system and generate a detection signal based on at least information associated with the feedback signal, the detection signal indicating the demagnetization period. The current-regulation component is configured to receive the drive signal, the detection signal and a current-sensing signal and output a current-regulation signal based on at least information associated with the drive signal, the detection signal, and the current sensing signal, the current-sensing signal representing the primary current in magnitude. In addition, the signal processing component is configured to receive the current-regulation signal and output a processed signal to the driving component in order to generate the drive signal. For example, the system controller is implemented according to at least FIG. 3(A) and/or FIG. 3(B).

According to another embodiment, a system controller for regulating an output current of a power conversion system includes a driving component, a current-regulation component, an amplifier and a comparator. The driving component is configured to output a drive signal to a switch in order to affect a primary current flowing through a primary winding of the power conversion system, the drive signal being associated with at least a switching period, the switching period including an on-time period and a demagnetization period. The current-regulation controller is configured to receive the drive signal, a detection signal and a current-sensing signal and output a first signal based on at least information associated with the drive signal, the detection signal, and the current sensing signal, the detection signal indicating the demagnetization period, the current-sensing signal representing the primary current in magnitude. The amplifier is configured to receive the first signal and a reference signal and generate, with at least a capacitor, an amplified signal based on at least information associated with the first signal and the reference signal. The comparator configured to receive the amplified signal and a ramp signal and generate a comparison signal based on at least information associated with the amplified signal and the ramp signal, the ramp signal being associated with at least a ramping period. The driving component is further configured to receive the comparison signal and a second signal associated with at least a signal period, process information associated with the comparison signal and the second signal, and generate the drive signal based on at least information associated with the comparison signal and the second signal. For example, the system controller is implemented according to at least FIG. 3(A) and/or FIG. 3(B).

According to yet another embodiment, a system controller for detecting a demagnetization period associated with a power conversion system includes a differentiation component, a comparator, and a detection component. The differentiation component is configured to receive a feedback signal associated with an output signal of the power conversion system and output a processed signal based on at least information associated with the feedback signal. The comparator is configured to receive at least the processed signal and generate a comparison signal based on at least information associated with the processed signal. The detection component is configured to receive at least the comparison signal and output a detection signal based on at least information associated with the comparison signal. The differentiation component includes a capacitor, a resistor and a current source. The capacitor includes a first capacitor terminal and a second capacitor terminal, the first capacitor terminal being configured to receive the feedback signal. The resistor includes a first resistor terminal and a second resistor terminal, the first resistor terminal being configured to output the processed signal, the second resistor terminal being biased to a predetermined voltage. The current source includes a first component terminal and a second component terminal, the first component terminal being coupled to the second capacitor terminal and the first resistor terminal. For example, the system controller is implemented according to at least FIG. 3(A), FIG. 3(B), FIG. 8(A), FIG. 8(B), FIG. 9, and/or FIG. 10.

In one embodiment, a method for regulating an output current of a power conversion system includes outputting a drive signal to a switch in order to affect a primary current flowing through a primary winding of the power conversion system, the drive signal being associated with at least a switching period, the switching period including an on-time period and a demagnetization period, receiving a feedback signal associated with an output voltage of the power conversion system, and processing information associated with the feedback signal. The method further includes generating a detection signal based on at least information associated with the feedback signal, the detection signal indicating the demagnetization period, receiving the drive signal, the detection signal and a current-sensing signal, the current-sensing signal representing the primary current in magnitude, and processing information associated with the drive signal, the detection signal and the current-sensing signal. In addition, the method includes outputting a current-regulation signal based on at least information associated with the drive signal, the detection signal, and the current sensing signal, receiving the current-regulation signal, processing information associated with the current-regulation signal, and outputting a processed signal to the driving component in order to generate the drive signal. For example, the method is implemented according to at least FIG. 3(A) and/or FIG. 3(B).

In another embodiment, a method for regulating an output current of a power conversion system includes outputting a drive signal to a switch in order to affect a primary current flowing through a primary winding of the power conversion system, the drive signal being associated with at least a switching period, the switching period including an on-time period and a demagnetization period, receiving the drive signal, a detection signal and a current-sensing signal, the detection signal indicating the demagnetization period, the current-sensing signal representing the primary current in magnitude, and processing information associated with the drive signal, the detection signal and the current-sensing signal. The method further includes outputting a first signal based on at least information associated with the drive signal, the detection signal, and the current sensing signal, receiving the first signal and a reference signal, and processing information associated with the first signal and the reference signal. In addition, the method includes generating, with at least a capacitor, an amplified signal based on at least information associated with the first signal and the reference signal, receiving the amplified signal and a ramp signal, the ramp signal being associated with at least a ramping period, and processing information associated with the amplified signal and the ramp signal. Furthermore, the method includes generating a comparison signal based on at least information associated with the amplified signal and the ramp signal, receiving the comparison signal and a second signal associated with at least a signal period, processing information associated with the comparison signal and the second signal, and generating the drive signal based on at least information associated with the comparison signal and the second signal. For example, the method is implemented according to at least FIG. 3(A) and/or FIG. 3(B).

In yet another embodiment, a method for detecting a demagnetization period associated with a power conversion system includes receiving, by at least a capacitor, a feedback signal associated with an output signal of the power conversion system, the capacitor including a first capacitor terminal and a second capacitor terminal, the first capacitor terminal receiving the feedback signal, the second capacitor terminal being coupled to a first component terminal of a current source, the current source further including a second component terminal, providing a current, by the current source, to at least a resistor including a first resistor terminal and a second resistor terminal, the first resistor terminal being coupled to the first component terminal, the second resistor terminal being biased to a predetermined voltage, and processing information associated with the feedback signal and the current. The method further includes outputting, by at least the first resistor terminal, a processed signal based on at least information associated with the feedback signal and the current, receiving at least the processed signal and a reference signal, and processing information associated with the processed signal and the reference signal. In addition, the method includes generating a comparison signal based on at least information associated with the processed signal and the reference signal, receiving at least the comparison signal, and generating a detection signal based on at least information associated with the comparison signal. For example, the method is implemented according to at least FIG. 3(A), FIG. 3(B), FIG. 8(A), FIG. 8(B), FIG. 9, and/or FIG. 10.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, various embodiments and/or examples of the present invention can be combined.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A system controller for regulating an output current of a power conversion system, the system controller comprising:
   a driving component configured to output a drive signal to a switch in order to affect a primary current flowing through a primary winding of the power conversion system, the drive signal being associated with at least a switching period, the switching period including an on-time period and a demagnetization period;
   a demagnetization detector configured to receive a feedback signal associated with an output voltage of the power conversion system and generate a detection signal based on at least information associated with the feedback signal, the detection signal indicating the demagnetization period;
   a current-regulation component configured to receive the drive signal, the detection signal and a current-sensing signal and output a current-regulation signal based on at least information associated with the drive signal, the detection signal, and the current-sensing signal, the current-sensing signal representing the primary current in magnitude; and
   a signal processing component configured to receive the current-regulation signal and output a processed signal to the driving component in order to generate the drive signal;
   wherein the demagnetization detector is further configured to:
      if the power conversion system operates in the demagnetization period, generate the detection signal at a first logic level; and
      if the power conversion system does not operate in the demagnetization period, generate the detection signal at a second logic level, the first logic level being different from the second logic level.

2. The system controller of claim 1, wherein the detection signal represents whether the demagnetization period has started and whether the demagnetization period has ended.

3. A system controller for a power converter, the system controller comprising:
   a drive signal generator configured to output a drive signal to a switch in order to affect a current flowing through a primary winding of a power converter, the drive signal being related to a switching period, the switching period including an on-time period and an off-time period, the off-time period including a demagnetization period; and
   a detection signal generator configured to receive a feedback signal being related to an output voltage of the power converter and generate a detection signal based at least in part on the feedback signal, the switch being closed during the on-time period, the switch being open during the demagnetization period, the detection signal being different from the drive signal; and
   a regulation signal generator configured to:
      receive the drive signal;
      receive the detection signal, the detection signal indicating the demagnetization period and being different from the drive signal;
      receive an input signal, the input signal representing the current flowing through the primary winding in magnitude; and
      output a regulation signal based at least in part on the drive signal, the detection signal, and the input signal.

4. The system controller of claim 3 wherein the detection signal represents whether the demagnetization period has started and whether the demagnetization period has ended.

5. The system controller of claim 3 wherein the detection signal generator is further configured to:
   in response to the power converter operating in the demagnetization period, generate the detection signal at a first logic level; and
   in response to the power converter not operating in the demagnetization period, generate the detection signal at a second logic level, the first logic level being different from the second logic level.

6. The system controller of claim 3 wherein:
a starting time of the demagnetization period is the same as a starting time of the off-time period; and
an ending time of the demagnetization period is the same as an ending time of the off-time period.

7. The system controller of claim 3 wherein:
a starting time of the demagnetization period is the same as a starting time of the off-time period; and
an ending time of the demagnetization period is earlier than an ending time of the off-time period.

8. The system controller of claim 3, and further comprising:
a processed signal generator configured to receive the regulation signal and output a processed signal;
wherein the drive signal generator includes:
a flip-flop configured to receive the processed signal and a first signal and output a second signal based at least in part on the processed signal and the first signal; and
a driver configured to receive the second signal and output the drive signal based at least in part on the second signal.

9. The system controller of claim 3 wherein the detection signal represents whether the demagnetization period has started and whether the demagnetization period has ended.

10. The system controller of claim 3 wherein the detection signal generator is further configured to:
in response to the power converter operating in the demagnetization period, generate the detection signal at a first logic level; and
in response to the power converter not operating in the demagnetization period, generate the detection signal at a second logic level, the first logic level being different from the second logic level.

11. The system controller of claim 8 wherein the driver includes an AND gate configured to receive the second signal and the first signal.

12. The system controller of claim 8 wherein the processed signal generator includes:
an amplifier configured to receive the regulation signal and a reference signal and generate, with at least a capacitor, an amplified signal based at least in part on the regulation signal and the reference signal; and
a comparator configured to receive the amplified signal and generate the processed signal based at least in part on the amplified signal.

13. The system controller of claim 12 wherein the processed signal generator further includes:
a ramp signal generator configured to output the first signal to the flip-flop and output a ramp signal to the comparator, the first signal being related to a clock frequency corresponding to a clock period, the ramp signal being related to a ramping frequency corresponding to a ramping period.

14. The system controller of claim 13 wherein:
the ramping frequency is equal to the clock frequency; and
the ramping period is equal to the clock period in duration.

15. The system controller of claim 12 wherein the processed signal generator further includes:
a quasi-resonance detector configured to receive the feedback signal and output the first signal to the flip-flop; and
a ramp signal generator configured to receive the first signal and output a ramp signal to the comparator, the ramp signal being related to a ramping period.

16. The system controller of claim 15 wherein the quasi-resonance detector is further configured to, in response to the feedback signal indicating the demagnetization period has ended, change the first signal from a first logic level to a second logic level.

17. The system controller of claim 16 wherein the ramp signal generator is further configured to, in response to the first signal changing from the first logic level to the second logic level, increase the ramp signal in magnitude.

18. The system controller of claim 15 wherein the ramp signal generator is further configured to decrease the ramp signal in magnitude at an end of the ramping period.

19. The system controller of claim 15 wherein the ramping period varies in duration over time.

20. The system controller of claim 3 wherein the detection signal generator includes:
a first signal generator configured to receive the feedback signal and output a first signal based at least in part on the feedback signal;
a comparator configured to receive the first signal and generate a comparison signal; and
a detector configured to receive the comparison signal and the drive signal and output the detection signal based at least in part on the comparison signal and the drive signal.

21. The system controller of claim 20 wherein the first signal generator includes:
a capacitor including a first capacitor terminal and a second capacitor terminal;
a first resistor including a first resistor terminal and a second resistor terminal; and
a second resistor including a third resistor terminal and a fourth resistor terminal;
wherein:
the first resistor terminal is biased to a first voltage;
the second resistor terminal is connected to the third resistor terminal;
the second capacitor terminal is connected to the second resistor terminal; and
the fourth resistor terminal is biased to a second voltage;
wherein:
the first capacitor terminal is configured to receive the feedback signal; and
the second resistor terminal is configured to output the first signal.

22. The system controller of claim 20 wherein the detection signal represents whether the demagnetization period has started and whether the demagnetization period has ended.

23. The system controller of claim 20 wherein the detection signal generator is further configured to:
in response to the power converter operating in the demagnetization period, generate the detection signal at a first logic level; and
in response to the power converter not operating in the demagnetization period, generate the detection signal at a second logic level, the first logic level being different from the second logic level.

24. The system controller of claim 3 wherein the regulation signal generator includes:
a first signal generator configured to receive the drive signal, sample the input signal at a middle point of the on-time period, and hold the sampled input signal; and
a second signal generator configured to receive the detection signal and output the regulation signal;

wherein the second signal generator is further configured to,
  in response to the detection signal indicating that the power converter operates in the demagnetization period, output the held sampled input signal; and
  in response to the detection signal indicating that the power converter does not operate in the demagnetization period, output a ground voltage signal.

25. The system controller of claim 24 wherein the first signal generator includes:
  a timer configured to receive the drive signal and output a sampling signal;
  a first switch configured to be open or closed in response to the sampling signal; and
  a capacitor coupled to the first switch;
  wherein:
    the timer is further configured to output the sampling signal at a logic first level during a first half of the on-time period and output the sampling signal at a logic second level during a second half of the on-time period;
    the first switch is further configured to be open in response to the sampling signal being at the logic second level and be closed in response to the sampling signal being at the logic first level; and
    the capacitor is configured to receive the input signal through the first switch in response to the first switch being open.

26. The system controller of claim 24 wherein the second signal generator includes:
  a first switch coupled to the first signal generator and configured to be closed in response to the detection signal indicating the power converter operates in the demagnetization period and be open in response to the detection signal indicating the power converter does not operate in the demagnetization period; and
  a second switch configured to be open in response to the detection signal indicating the power converter operates in the demagnetization period and be closed in response to the detection signal indicating the power converter does not operate in the demagnetization period;
  wherein the second switch is further configured to receive the ground voltage signal.

27. The system controller of claim 24 wherein the detection signal represents whether the demagnetization period has started and whether the demagnetization period has ended.

28. The system controller of claim 24 wherein the detection signal generator is further configured to:
  in response to the power converter operating in the demagnetization period, generate the detection signal at a first logic level; and
  in response to the power converter not operating in the demagnetization period, generate the detection signal at a second logic level, the first logic level being different from the second logic level.

29. A system controller for a power converter, the system controller comprising:
  a drive signal generator configured to output a drive signal to a switch in order to affect a current flowing through a primary winding of the power converter, the drive signal being related to a switching period, the switching period including an on-time period and a demagnetization period;
  an amplifier configured to receive a first signal and a reference signal and generate, with a capacitor, an amplified signal based at least in part on the first signal and the reference signal, the first signal being related to the drive signal, a detection signal, and an input signal, the detection signal indicating the demagnetization period, the input signal representing the current in magnitude; and
  a comparator configured to receive the amplified signal and a ramp signal and generate a comparison signal based at least in part on the amplified signal and the ramp signal, the amplified signal being related to the first signal, the ramp signal being related to a ramping period;
  wherein the drive signal generator is further configured to:
    receive the comparison signal and a second signal being related to a signal period;
    process the comparison signal and the second signal; and
    generate the drive signal based at least in part on the comparison signal and the second signal.

30. The system controller of claim 29 wherein:
  the second signal includes a pulse within the signal period; and
  the ramp signal increases in magnitude during at least a part of the ramping period.

31. The system controller of claim 29 wherein:
  the ramping period includes a first time duration and a second time duration;
  during the first time duration, the ramp signal increases from a first magnitude to a second magnitude; and
  during the second time duration, the ramp signal decreases from the second magnitude to the first magnitude.

32. The system controller of claim 29 wherein:
  the ramp signal is related to a ramping frequency corresponding to the ramping period;
  the second signal is related to a signal frequency corresponding to the signal period;
  the ramping frequency is equal to the signal frequency; and
  the ramping period is equal to the signal period.

33. The system controller of claim 29 wherein the second signal changes from a first logic level to a second logic level in response to the demagnetization period having ended.

34. The system controller of claim 33 wherein, in response to the second signal changing from the first logic level to the second logic level, the ramp signal increases in magnitude.

35. The system controller of claim 34 wherein the ramp signal decreases in magnitude at an end of the ramping period.

36. The system controller of claim 29 wherein the ramping period varies in duration over time.

37. The system controller of claim 29 wherein the drive signal generator includes:
  a flip-flop configured to receive the comparison signal and the second signal and output a third signal based at least in part on the comparison signal and the second signal; and
  a driver configured to receive the third signal and output the drive signal based at least in part on the third signal.

38. The system controller of claim 37, and further comprising:
  a first signal generator configured to output the second signal to the flip-flop and output the ramp signal to the comparator, the second signal being related to a signal frequency corresponding to the signal period, the ramp signal being related to a ramping frequency corresponding to the ramping period.

39. The system controller of claim 38 wherein:
the ramping frequency is equal to the signal frequency; and
the ramping period is equal to the signal period in duration.

40. The system controller of claim 37, and further comprising:
a quasi-resonance detector configured to receive a feedback signal and output the second signal to the flip-flop, the second signal indicating whether the power converter operates in a quasi-resonant mode; and
a ramp signal generator configured to receive the second signal and output the ramp signal to the comparator.

41. The system controller of claim 29 wherein the detection signal represents whether the demagnetization period has started and whether the demagnetization period has ended.

42. The system controller of claim 29 wherein the amplifier includes a transconductance amplifier.

43. The system controller of claim 29, and further comprising:
a first signal generator configured to receive the drive signal, sample the input signal at a middle point of the on-time period, and hold the sampled input signal; and
a second signal generator configured to receive the detection signal and output the first signal;
wherein the second signal generator is further configured to,
in response to the detection signal indicating that the power converter operates in the demagnetization period, output the held sampled input signal; and
in response to the detection signal indicating that the power converter does not operate in the demagnetization period, output a ground voltage signal.

44. The system controller of claim 43 wherein the first signal generator includes:
a timer configured to receive the drive signal and output a sampling signal;
a first switch configured to be open or closed in response to the sampling signal; and
a capacitor coupled to the first switch;
wherein:
the timer is further configured to output the sampling signal at a logic first level during a first half of the on-time period and output the sampling signal at a logic second level during a second half of the on-time period;
the first switch is further configured to be open in response to the sampling signal being at the logic second level and be closed in response to the sampling signal is at the logic first level; and
the capacitor is configured to receive the input signal through the first switch in response to the first switch being open.

45. The system controller of claim 43 wherein the second signal generator includes:
a first switch coupled to the first signal generator and configured to be closed in response to the detection signal indicating the power converter operates in the demagnetization period and be open in response to the detection signal indicating the power converter does not operate in the demagnetization period; and
a second switch configured to be open in response to the detection signal indicating the power converter operates in the demagnetization period and be closed in response to the detection signal indicating the power converter does not operate in the demagnetization period;
wherein the second switch is further configured to receive the ground voltage signal.

46. A system controller for a power converter, the system controller comprising:
a processed signal generator configured to receive a feedback signal being related to an output signal of a power converter and output a processed signal based at least in part on the feedback signal; and
a detection signal generator configured to receive a comparison signal and output a detection signal based at least in part on the comparison signal, the comparison signal being related to the processed signal;
wherein the processed signal generator includes:
a capacitor including a first capacitor terminal and a second capacitor terminal, the first capacitor terminal being configured to receive the feedback signal;
a resistor including a first resistor terminal and a second resistor terminal, the first resistor terminal being configured to output the processed signal, the second resistor terminal being biased to a predetermined voltage; and
a current generator including a first generator terminal and a second generator terminal, the first generator terminal being coupled to the second capacitor terminal and the first resistor terminal.

47. The system controller of claim 46 wherein the detection signal generator includes:
a first flip-flop configured to receive the comparison signal and output a first signal based at least in part of the comparison signal;
a second flip-flop configured to receive the comparison signal and output a second signal based at least in part on the comparison signal; and
a first signal generator configured to receive the first signal and the second signal and output the detection signal based at least in part on the first signal and the second signal.

48. The system controller of claim 46, and further comprising a drive signal generator configured to output a drive signal to a switch in order to affect a current flowing through a primary winding of the power converter, the drive signal being related to a switching frequency corresponding to a switching period, the switching period including an on-time period and a demagnetization period;
wherein the drive signal generator is further configured to output the drive signal to the detection signal generator.

49. A method for a power converter, the method comprising:
outputting a drive signal in order to affect a current flowing through a primary winding of a power converter, the drive signal being related to a switching period, the switching period including an on-time period and a demagnetization period;
receiving a feedback signal being related to an output voltage of the power converter;
processing the feedback signal;
generating a detection signal based at least in part on the feedback signal, the detection signal indicating the demagnetization period;
receiving the drive signal, the detection signal and an input signal, the input signal representing the current in magnitude;
processing the drive signal, the detection signal and the input signal; and outputting a regulation signal based at least in part on the drive signal, the detection signal, and the input signal.

50. The method of claim 49 wherein the detection signal represents whether the demagnetization period has started and whether the demagnetization period has ended.

51. The method of claim 49 wherein the generating a detection signal based at least in part on the feedback signal includes:
   in response to operating in the demagnetization period, generating the detection signal at a first logic level; and
   in response to not operating in the demagnetization period, generating the detection signal at a second logic level, the first logic level being different from the second logic level.

52. A method for a power converter, the method comprising:
   outputting a drive signal in order to affect a current flowing through a primary winding of a power converter, the drive signal being related to a switching period, the switching period including an on-time period and a demagnetization period;
   receiving the drive signal, a detection signal and an input signal, the detection signal indicating the demagnetization period, the input signal representing the current in magnitude;
   processing the drive signal, the detection signal and the input signal;
   outputting a first signal based at least in part on the drive signal, the detection signal, and the input signal;
   receiving an amplified signal and a ramp signal, the amplified signal being related to the first signal, the ramp signal being related to a ramping period;
   processing the amplified signal and the ramp signal;
   generating a comparison signal based at least in part on the amplified signal and the ramp signal;
   receiving the comparison signal and a second signal being related to a signal period;
   processing the comparison signal and the second signal; and
   generating the drive signal based at least in part on the comparison signal and the second signal.

53. A method for detecting a demagnetization period related to a power converter, the method comprising:
   receiving, by a capacitor, a feedback signal being related to an output signal of a power converter, the capacitor including a first capacitor terminal and a second capacitor terminal, the first capacitor terminal receiving the feedback signal, the second capacitor terminal being coupled to a first generator terminal of a current generator, the current generator further including a second generator terminal;
   generating a current, by the current generator, to flow through a resistor including a first resistor terminal and a second resistor terminal, the first resistor terminal being coupled to the first generator terminal, the second resistor terminal being biased to a predetermined voltage;
   processing the feedback signal and the current;
   outputting a processed signal based at least in part on the feedback signal and the current;
   receiving a comparison signal, the comparison signal being related to the processed signal; and
   generating a detection signal based at least in part on the comparison signal.

* * * * *